US009098364B2

(12) United States Patent
Davis

(10) Patent No.: US 9,098,364 B2
(45) Date of Patent: Aug. 4, 2015

(54) MIGRATION SERVICES FOR SYSTEMS

(71) Applicant: ORACLE INTERNATIONAL CORPORATION, Redwood Shores, CA (US)

(72) Inventor: George Davis, Stow, MA (US)

(73) Assignee: Oracle International Corporation, Redwood Shores, CA (US)

( * ) Notice: Subject to any disclaimer, the term of this patent is extended or adjusted under 35 U.S.C. 154(b) by 55 days.

(21) Appl. No.: 13/938,066

(22) Filed: Jul. 9, 2013

(65) Prior Publication Data
US 2015/0020059 A1  Jan. 15, 2015

(51) Int. Cl.
*G06F 9/445* (2006.01)
(52) U.S. Cl.
CPC .................................... *G06F 8/60* (2013.01)
(58) Field of Classification Search
CPC ................ G06F 8/60; G06F 8/65; G06F 8/61
See application file for complete search history.

(56) References Cited

U.S. PATENT DOCUMENTS

| 6,477,483 | B1 | 11/2002 | Scarlat et al. |
| 6,738,811 | B1 | 5/2004 | Liang |
| 6,973,489 | B1 | 12/2005 | Levy |
| 7,548,898 | B1 | 6/2009 | Tarenskeen et al. |
| 7,580,862 | B1 * | 8/2009 | Montelo et al. .............. 705/26.1 |
| 2002/0019826 | A1 | 2/2002 | Tan |
| 2002/0147645 | A1 | 10/2002 | Alao et al. |
| 2002/0198984 | A1 | 12/2002 | Goldstein et al. |
| 2003/0066049 | A1 | 4/2003 | Atwood et al. |
| 2003/0069903 | A1 | 4/2003 | Gupta et al. |
| 2003/0192028 | A1 | 10/2003 | Gusler et al. |
| 2004/0260875 | A1 * | 12/2004 | Murotani et al. ............. 711/114 |
| 2005/0055446 | A1 | 3/2005 | Chidambaran et al. |
| 2005/0204241 | A1 | 9/2005 | Tamakoshi |

(Continued)

FOREIGN PATENT DOCUMENTS

| EP | 2418591 | 2/2012 |
| GB | 2468742 | 9/2010 |

(Continued)

OTHER PUBLICATIONS

U.S. Appl. No. 13/937,977, Non-Final Office Action mailed on Aug. 12, 2014, 28 pages.

(Continued)

*Primary Examiner* — Anna Deng
(74) *Attorney, Agent, or Firm* — Kilpatrick Townsend & Stockton LLP

(57) ABSTRACT

Systems and methods for systems migration are provided. A migration engine to perform system migration operations is provided. One or more processors may be configured to execute instructions to perform one or more of the following. Information indicative of one or more migration candidates corresponding to one or more system components in a source system may be collected. A migration strategy may be determined at least partially based on the information indicative of one or more migration candidates. The one or more migration candidates may be mapped to one or more system components of a target system. One or more scripts configured to copy system data and/or application data corresponding to the one or more system components in the source system for migration to the target system may be generated. One or more storage media coupled to the one or more processors may retain the instructions.

19 Claims, 11 Drawing Sheets

(56) References Cited

U.S. PATENT DOCUMENTS

| | | | |
|---|---|---|---|
| 2006/0235899 A1* | 10/2006 | Tucker | 707/200 |
| 2007/0150488 A1 | 6/2007 | Barsness et al. | |
| 2007/0299892 A1 | 12/2007 | Nakahara | |
| 2008/0313595 A1 | 12/2008 | Boulineau et al. | |
| 2009/0070733 A1 | 3/2009 | Huang et al. | |
| 2009/0113399 A1 | 4/2009 | Tzoref et al. | |
| 2009/0187413 A1 | 7/2009 | Abels et al. | |
| 2009/0210857 A1 | 8/2009 | Martineau | |
| 2010/0005097 A1 | 1/2010 | Liang et al. | |
| 2010/0198799 A1 | 8/2010 | Krishnan et al. | |
| 2011/0161933 A1 | 6/2011 | Hudson | |
| 2012/0150642 A1 | 6/2012 | Kandanala et al. | |
| 2012/0265726 A1 | 10/2012 | Padmanabhan et al. | |
| 2013/0085742 A1 | 4/2013 | Barker et al. | |
| 2013/0152050 A1 | 6/2013 | Chang et al. | |
| 2013/0311968 A1 | 11/2013 | Sharma | |
| 2014/0075033 A1 | 3/2014 | Doering et al. | |
| 2014/0089809 A1* | 3/2014 | Levy et al. | 715/736 |
| 2014/0109053 A1 | 4/2014 | Vasudevan et al. | |
| 2014/0279890 A1* | 9/2014 | Srinivasan et al. | 707/626 |
| 2014/0344439 A1 | 11/2014 | Kempf et al. | |
| 2015/0019195 A1 | 1/2015 | Davis | |
| 2015/0019197 A1 | 1/2015 | Higginson et al. | |
| 2015/0019478 A1 | 1/2015 | Buehne et al. | |
| 2015/0019479 A1 | 1/2015 | Buehne et al. | |
| 2015/0019487 A1 | 1/2015 | Buehne et al. | |
| 2015/0019488 A1 | 1/2015 | Higginson et al. | |
| 2015/0019564 A1 | 1/2015 | Higginson et al. | |
| 2015/0019700 A1 | 1/2015 | Masterson et al. | |
| 2015/0019706 A1 | 1/2015 | Raghunathan et al. | |
| 2015/0019707 A1 | 1/2015 | Raghunathan et al. | |

FOREIGN PATENT DOCUMENTS

| | | |
|---|---|---|
| JP | 2006277153 | 10/2006 |
| WO | 9952047 | 10/1999 |
| WO | 0153949 | 7/2001 |
| WO | 2015/005991 | 1/2015 |
| WO | 2015/005994 | 1/2015 |
| WO | 2015/006124 | 1/2015 |
| WO | 2015/006129 | 1/2015 |
| WO | 2015/006132 | 1/2015 |
| WO | 2015/006137 | 1/2015 |
| WO | 2015/006138 | 1/2015 |
| WO | 2015/006308 | 1/2015 |
| WO | 2015/006358 | 1/2015 |

OTHER PUBLICATIONS

Charles, Bug Severity vs. Priority, Quality Intelligence Blog, Retrieved on Aug. 4, 2014, from http://quality-intelligence.blogspot.com/2010/08/bug-severity-vs-priority.html, Aug. 22, 2010, 6 pages.

DAS et al., Albatross: Lightweight elasticity in shared storage databases for the cloud using live data migration, 37th International Conference on Very Large Data Bases, Proceedings of the VLDB Endowment, vol. 4, No. 8, Retrieved from the Internet:URL:http://www.cs.ucsb.eduj-sudiptojpapers/albatross.pdf, Aug. 29, 2011, 12 pages.

International Application No. PCT/US2014/040486, International Search Report and Written Opinion mailed on Sep. 29, 2014, 11 pages.

International Application No. PCT/US2014/040692, International Search Report and Written Opinion mailed on Oct. 8, 2014, 8 pages.

International Application No. PCT/US2014/045247, International Search Report and Written Opinion mailed on Sep. 3, 2014, 8 pages.

International Application No. PCT/US2014/045282, International Search Report and Written mailed on Sep. 16, 2014, 12 pages.

Chanchary et al., Data Migration: Connecting Databases in the Cloud, ICCIT 2012, Saudi Arabia, retrieved from the Internet: <URL:http://www.chinacloud.cnjupload/2012-03/12033108076850.pdf>, Jun. 28, 2012, pp. 450-455.

Leite et al., Migratool: Towards a Web-Based Spatial Database Migration Tool, IEEE Computer Society, Proceedings of the 16th International Workshop on Database and Expert Systems Applications, Aug. 22, 2005, pp. 480-484.

Tao et al., Intelligent database placement in cloud environment, Web Services (ICWS), 2012 IEEE 19th International Conference, IEEE Computer Society, Jun. 24, 2012, pp. 544-551.

International Application No. PCT/US2014/045226, International Search Report and Written Opinion mailed on Oct. 30, 2014, 10 pages.

International Application No. PCT/US2014/045240, International Search Report and Written Opinion mailed on Oct. 21, 2014, 10 pages.

International Application No. PCT/US2014/045289, International Search Report and Written Opinion mailed on Oct. 15, 2014, 9 pages.

International Application No. PCT/US2014/045721, International Search Report and Written Opinion mailed on Nov. 4, 2014, 12 pages.

International Application No. PCT/US2014/045804, International Search Report and Written Opinion mailed on Nov. 17, 2014, 12 pages.

U.S. Appl. No. 13/937,970, Non-Final Office Action mailed on May 5, 2015, 17 pages.

U.S. Appl. No. 13/937,977, Final Office Action mailed on Feb. 26, 2015, 30 pages.

* cited by examiner

MIGRATION SERVICES FOR SYSTEMS

CROSS-REFERENCES TO RELATED APPLICATIONS

U.S. patent application Ser. No. 13/937,977 filed Jul. 9, 2015, and entitled "METHOD AND SYSTEM FOR REDUCING INSTABILITY WHEN UPGRADING SOFTWARE;"

U.S. patent application Ser. No. 13/938,061 filed Jul. 9, 2015, and entitled "CONSOLIDATION PLANNING SERVICES FOR SYSTEMS MIGRATION;"

U.S. patent application Ser. No. 13/937,885 filed Jul. 9, 2015, and entitled "DATABASE MODELING AND ANALYSIS;"

U.S. patent application Ser. No. 13/937,868 filed Jul. 9, 2015, and entitled "AUTOMATED DATABASE MIGRATION ARCHITECTURE;"

U.S. patent application Ser. No. 13/937,344 filed Jul. 9, 2015, and entitled "CLOUD SERVICES LOAD TESTING AND ANALYSIS;"

U.S. patent application Ser. No. 13/937,483 filed Jul. 9, 2015, and entitled "CLOUD SERVICES PERFORMANCE TUNING AND BENCHMARKING;"

U.S. patent application Ser. No. 13/937,988 filed Jul. 9, 2015, and entitled "SOLUTION TO GENERATE A SCRIPTSET FOR AN AUTOMATED DATABASE MIGRATION;"

U.S. patent application Ser. No. 13/937,545 filed Jul. 9, 2015, and entitled "ONLINE DATABASE MIGRATION;"

U.S. patent application Ser. No. 13/937,486 filed Jul. 9, 2015, and entitled "DYNAMIC MIGRATION SCRIPT MANAGEMENT;" and U.S. patent application Ser. No. 13/937,970 filed Jul. 9, 2015, and entitled "ADVANCED CUSTOMER SUPPORT SERVICES ADVANCED SUPPORT CLOUD PORTAL."

BACKGROUND

The present disclosure relates in general to managing networked resources, and, more specifically, but not by way of limitation, to systems and methods of migration of systems.

Modern systems such as, for example, databases, operating systems, applications, and/or the like, are very complex, comprised of numerous components. Managing the systems, diagnosing problems, updating software, and installing new components may therefore be a very involved and complicated task. As a result, system administrator may spend considerable time determining problems, upgrading software, and installing new components. In many cases, specialists or specially trained technicians and administrators may be needed on site to perform the more complicated and specialized tasks.

The necessity to use specially trained technicians and administrators may increase costs and/or increase delays and uncertainty of maintaining and operating the systems. It may often take days or even weeks for a technician or administrator trained to be available to come to a specific site to upgrade software or diagnose a problem. The cost of travel, time, and time investment for the technician or administrator to understand the system and components before the work may begin may further add to the time delay and costs.

Therefore what is needed are improved methods and systems for providing services for managing, migrating and upgrading systems.

BRIEF SUMMARY

In one aspect, a system migration engine to perform system migration operations is provided. One or more processors may be configured to execute instructions to perform one or more of the following. Information indicative of one or more migration candidates corresponding to one or more system components in a source system may be collected. A migration strategy may be determined at least partially based on the information indicative of one or more migration candidates. The one or more migration candidates may be mapped to one or more system components of a target system. One or more scripts configured to copy system data and/or application data corresponding to the one or more system components in the source system for migration to the target system may be generated. One or more storage media coupled to the one or more processors may retain the instructions.

In another aspect, a method to perform system migration operations is provided. The method may include one or more of the following. Information indicative of one or more migration candidates corresponding to one or more system components in a source system may be collected. A migration strategy may be determined at least partially based on the information indicative of one or more migration candidates. The one or more migration candidates may be mapped to one or more system components of a target system. One or more scripts configured to copy system data and/or application data corresponding to the one or more system components in the source system for migration to the target system may be generated.

In yet another aspect, a non-transitory computer-readable storage medium having stored thereon instructions for performing systems migration operations is provided. The instructions, when executed by one or more processors, may cause the one or more processors to perform one or more of the following. Information indicative of one or more migration candidates corresponding to one or more system components in a source system may be collected. A migration strategy may be determined at least partially based on the information indicative of one or more migration candidates. The one or more migration candidates may be mapped to one or more system components of a target system. One or more scripts configured to copy system data and/or application data corresponding to the one or more system components in the source system for migration to the target system may be generated.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
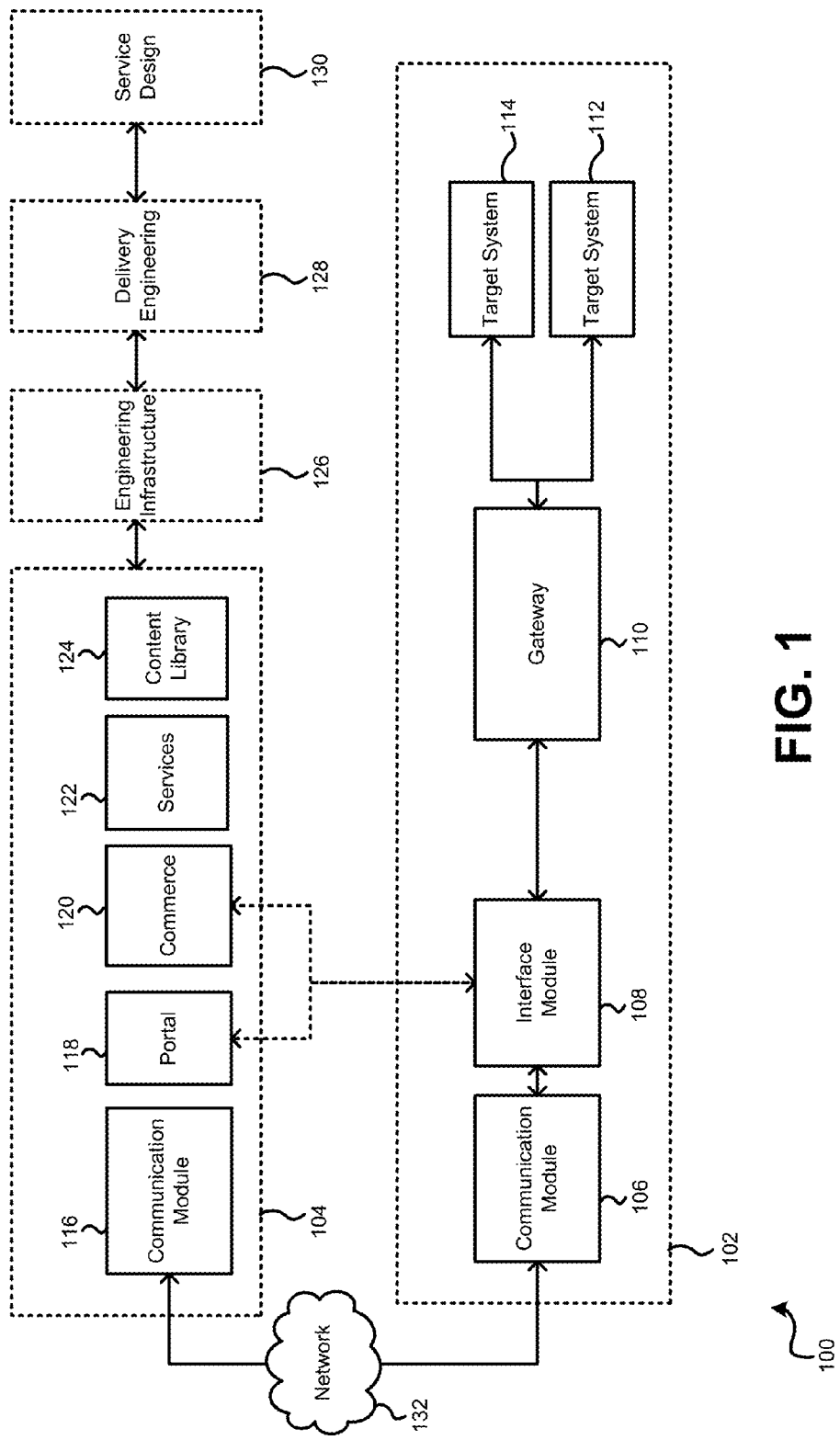
FIG. 1 illustrates an embodiment of a support platform system.

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment of the disclosure. It should be understood that various changes may be made in the function and arrangement of elements without departing from the spirit and scope of the disclosure as set forth in the appended claims.

Specific details are given in the following description to provide a thorough understanding of the embodiments. However, it will be understood by one of ordinary skill in the art that the embodiments maybe practiced without these specific details. For example without limitation, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" includes, but is not limited to, portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Certain embodiments according to the present disclosure may provide customers with legacy systems, such as, for example, databases, operating systems, applications, and/or the like, with effective migration planning and execution from non-cloud technologies to a cloud (e.g., a private cloud). Certain embodiments may provide a cloud migration service, including a migration engine that provides an automated and validated approach to such migration. Such an approach may allow a customer to meet their Recovery Time Objective (RTO). Certain embodiments may create, test and document a migration strategy by executing a method that will reduce migration time and errors associated with migration that would otherwise impact the customer. Certain embodiments may successfully, efficiently, and automatically migrate legacy system(s) to a cloud within an allotted customer outage window.

Legacy systems may require administration such as periodic maintenance, software upgrades, migration, service deployment, diagnostics, performance tuning, and/or other services. Some organizations and businesses may employ system administrators or other personnel to perform some of these tasks. In some cases, some tasks may require special skills or knowledge outside the scope of a typical administrator and may require an outside expert or personnel to accomplish the tasks. In some cases, the administration tasks may be performed by an outside entity or engineer as a service to the organization or business. And, traditionally, services are provided based on multiple engagements with customer contacts, and creating a contract and service delivery plan tailored to the customer's needs. Service delivery itself is traditionally provided onsite and based on the specific knowledge and/or software the service engineer has access to and may differ from engineer to engineer.

Many of the administrative tasks and services associated with systems may be simplified and streamlined with a platform architecture that supports remote administration, development, and deployment of services. A system may be configured with a support cloud platform to allow automation of tasks and services and the reuse of components. The platform may be used to generate, store, deploy, execute, and track services through their complete life cycle. Services may be designed, made available for deployment, deployed to a customer, and monitored using the platform.

The platform may include a remote portal from which customers, administrators, and service provider may monitor, deploy, and analyze services for a remote customer's target system. The administration may be performed and controlled remotely and at least in part automatically. Services may be controlled and deployed to the target system using the portal eliminating the need for an administrator to be local to the target system. Likewise, the portal provides a rich set of tools for all customers and depends less on the individual skill and knowledge of the particular engineer performing service.

The support cloud platform may facilitate performing services in at least a partially automated and remote manner and may result in a number of important benefits to the service provider and the customer. For example, the platform may reduce the time to market for new services. A unified platform which enables services to be built using common features/components may reduce the time to develop and test the new service. Automation and consistency may allow the service provider to create a standard pricing and contracting model that can be re-used for new services. Sales and contracting time for new services may be reduced due the simplified pricing model. A service provider may create a modular service portfolio and can deliver services discretely or as part of a solution. The platform may reduce the cost of developing and delivering services. A common platform for all services may enable service designers and developers to leverage common features. As developers create more automated services, this reduces/eliminates the need for manual input, thus reducing the cost of delivering a service. The platform may provide for an improvement in global service quality and consistency since services may be designed, developed and delivered through the platform in at least a partially automated manner. The platform may also expand the market for services enabling services to be easily sold and delivered.

In some embodiments, the support cloud platform may be used for the development and deployment of services including assessment services assessing infrastructure, business data, and/or transactions of the database system. The services may leverage analytics to identify key indicators, patterns and/or trends. Services may install, monitor and/or perform setup of new software and/or hardware. Services may install and implement gold images or perform migrations, upgrades, and consolidations. In addition services may include provisioning, cloning, backup and recovery, install, setup, test, monitoring, recovery and restore, metering, chargeback, testing, load testing, functional testing, performance management and tuning, and/or the like. In some embodiments the services may leverage one service as a basis for other services. Details of some of the services may be found in the above cross-referenced U.S. patent applications.

Various embodiments will now be discussed in greater detail with reference to the accompanying figures, beginning with FIG. 1.

FIG. 1 illustrates an embodiment of a support cloud platform 100. The platform may be used to through the life cycle of a service. Services may be designed, made available for deployment, deployed to a customer, and monitored using the platform. The customer data center 102 may include one or more target systems 112, 114 that may be the target of the services provided by the platform. The target systems may be servers, computers, rack systems, and the like that run or execute a database and/or other database software used by a customer. A target system may be a hardware or software entity that can have service delivered and may be a host, database, web logic service, and/or the like. In the customer data center 102, the target systems 112, 114 may be managed by an administrator local to the data center 102. The administrator may have physical access to the target systems 112, 114. The cloud platform 100, may provide for the administration and other services of the target systems via a remote interface from a remote location. A gateway 110, located on the data center 102 provides remote access to the data center 102 and one or more target systems 112, 114. The gateway 110 may be a hardware or virtual software appliance installed at the customer data center. The gateway 110 connects to a production cloud 104 of a service provider via a secure connection using a communication module 106 over a network 132. The gateway 110 may optionally have an interface module 108 allowing control of the interactions of gateway 110 to the production cloud 104 of the service provider.

Services may be generated and developed using a common service development framework of the platform. The common service development framework may include a service design 130, delivery engineering 128, and engineering infrastructure 126 modules. The common service development framework may leverage common components that can be used throughout the delivery process (manual and/or automated), and may enable the efficient design, development, testing and release of a service. The common service development framework of the platform enables at least partial automation of the development of a service.

The platform enables delivery engineers to automate the service they are developing. In some embodiments, the development of services may be automated or simplified with the use of reusable components. For example, many of the same deployment, execution, and error handling function used in the services may be designed as reusable components. The components may be reused in many services allowing the design and coding of the service to be focused on the new core functionality of the service. Using the platform, services may be designed and implemented in one or more central locations. A centralized service design and development platform enables a hierarchical and structured service design with reusable components and modules. The development of a service may be, at least in part, automated since a large portion of the components of a service may be assembled from existing reusable components.

After the services are designed, developed, and tested, they may be stored at the production cloud 104. The production cloud 104 may include a library of services 122 and a content library 124. The services and content may be deployed from the production cloud 104 to one or more target systems 112, 114 at a customer data center 102. The deployment, monitoring, and the like of services may be arranged with interaction from the portal 118 and commerce module 120 at the production cloud 104 and the gateway 110 and an interface module 108 at the customer data center 102 via the communication modules 106, 116. The design, deployment and monitoring of the service may be performed remotely from production cloud without the need of an administrator or engineer at the customer's data center 102. The portal 118 of the platform may provide for remote control and administration of services, control of deployment, and analysis of results.

The platform of FIG. 1 may be used to develop, deploy, and manage services for the customer data center 102 and target systems 112, 114. A gateway 110 has access to the target systems 112, 114. Services, in the forms of software, scripts, functions, and the like, may be downloaded from the production cloud 104. The commerce module 120 and the portal for the production cloud 104 provide an interface, selection tools, monitoring tools, for selecting the services, and monitoring the services to be deployed in the customer data center 102. An administrator at the customer data center 102 may view, select, and monitor the services using the portal 118 and commerce module 120. The customer may access the portal 118 and commerce module 120 using interface module 108 at the customer data center 102. The interface module may have a direct or an indirect access to the portal 118 and the commerce module via the communication module 106. For example, using the platform 100, a service may be selected using the commerce module 120. The commerce module 120 may be accessed using the interface module 108. Once a service is selected and configured for the target systems 112, 114, the service may be deployed from the production cloud 104 to the customer data center 102 via the gateway 110. The gateway may deploy the service on to the target systems. The gateway 110 may be used to gather data statistics, monitor services, and receive system information about the customer data center and the target systems. The data may be processed, analyzed, and transmitted to the production cloud. The data may be used to suggest or deploy services to the customer, present statistics or metrics of the customer's target servers using the portal 118.

Figure 2:
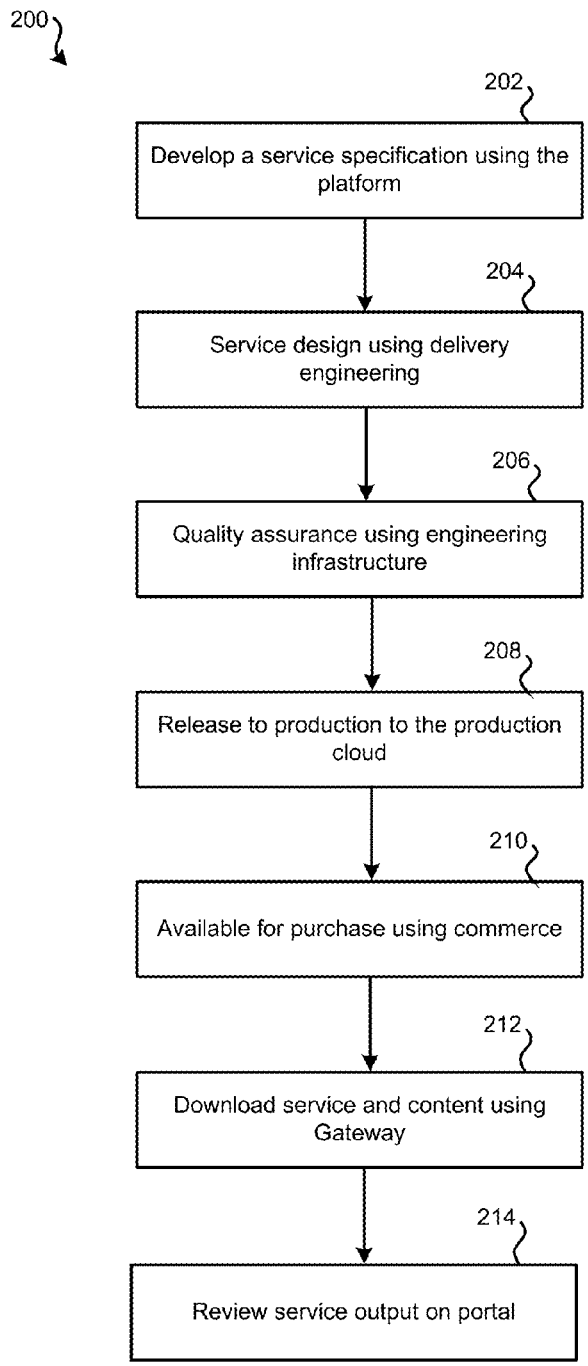
FIG. 2 illustrates a flow diagram summarizing the life cycle of a service.

FIG. 2 shows a flow diagram showing a lifecycle of a service in the context of the platform from FIG. 1. A service begins its life cycle when a service specification is developed using the platform at block 202. The service specification may define the characteristics of the service, requirements, actions the service may take, data the service may monitor or collect, the operating characteristics of the systems of the service and/or the like. The service specification may be developed, at least in part, based on the data received from the platform. Data about customer's target systems, usage, statistics, and the like may be received from the customer's data center via the gateway 110. The data may be used determine the specification of the service. For example, data received from the gateway regarding customer's target systems may indicate that a database on the system may be running on outdated software. A service for upgrading and migrating the database to the new software may be needed. Based on the data received from the gateway the specification for the service may be defined. The data received from the gateway may, for example, include the software versions, workload types, sizes, information about the target systems, and the like.

The service specification may be developed in the service design 130 module of the platform. The service design 130 module may include automated tools for analyzing data to determine the service specification. The service design may include input from a development team, management, customer, and/or the like.

Once the specification of the service is defined, the service may be designed in block 204 at the delivery engineering module 128 of the platform 100. The specification may be used by the delivery engineering module 128 to design, develop, and test the service from the specification. The delivery engineering module 128 may assemble one or more existing blocks of code, scripts, functions, and/or the like to implements the service described by the service specification. The delivery engineering 128 module may, at least in part, automatically change parameters for existing services to match the specification for a new service. For example, a systems migration service may have many of the same common features independently of the characteristics of the migration. A service for a specific migration may use an existing migration service and disable some unnecessary features, such as data monitoring, for example. Delivery engineering 128 may in some embodiments comprise of one or more developers who write scripts, code, and the like to generate a program to implement the service. In some embodiments delivery engineering may be an automated system that implements the service from the specification.

The developed service may be passed on to the engineering infrastructure module 126 for quality assurance in block 206. During quality assurance, the service may be tested and content for each service may be developed. The engineering infrastructure may employ a test farm of servers and sample target system that may mirror the parameters, specifications, and characteristics of customer target systems. The test farm may be used to analyze and stress test the service in a rigorous and monitored manner. The service may further be analyzed and redeveloped into reusable components to allow other services to reuse the core functionality and functions developed for the service.

In block 208 the tested service may be passed on to production to the production cloud 104. In block 208 the service is formally released and is ready for a customer download to the customer gateway 110. At the same time, the service may be release to other channels such as marketing, sales, pricing and contracting sites, commerce channels, and the like. The service may be stored or made available at the services module 122.

The service may be made available for purchase at the commerce module 120 of the platform 100 in block 210. The commerce module may include a generated user interface (UI) that a customer may access via a network and a browser and/or the interface module 108 at the customer data center 102. A customer may use the commerce module 120 to search and browse for service offerings. The commerce module 120 may show the features, compatibility, price, and the like for the service and the specific customer. A customer may purchase, review and agree to contract terms for the service, request assistance, and/or the like using the commerce module 120. A service may be made purchased and immediately or after a period of validation made available for delivery and setup at the customer target systems. Validation may include authorization of the customer's target system, payment validation, and/or the like.

After purchase the service and/or content may be downloaded at block 212. After purchase a customer may be provided with access to the portal 118 to initiate service and/or content delivery. The portal may deploy a service and/or content package to the customer's gateway 110. The gateway may then install and/or execute the service and/or content on the target systems automatically. The execution and deployment may be controlled through the portal 118 which may be remote from the customer's data center 102. During and after the deployment and execution of the service and/or content, the gateway may transmit data to the portal regarding the execution of the service, data gathered by the service, status, and/or other data and metrics.

During and after the deployment a customer may access the portal 118 and review the service output in block 214. The portal 118 may provide a summary of the data gathered by the service and transmitted to the portal via the gateway 110. The portal may provide the customer with a full view of all service engagements with the service provider, and also may provide the customer with a deeper understanding of their systems and applications. The portal may comprise and interface and a back-end to facilitate functions of the portal 118 and interact with other parts of the platform 100.

Figure 3:
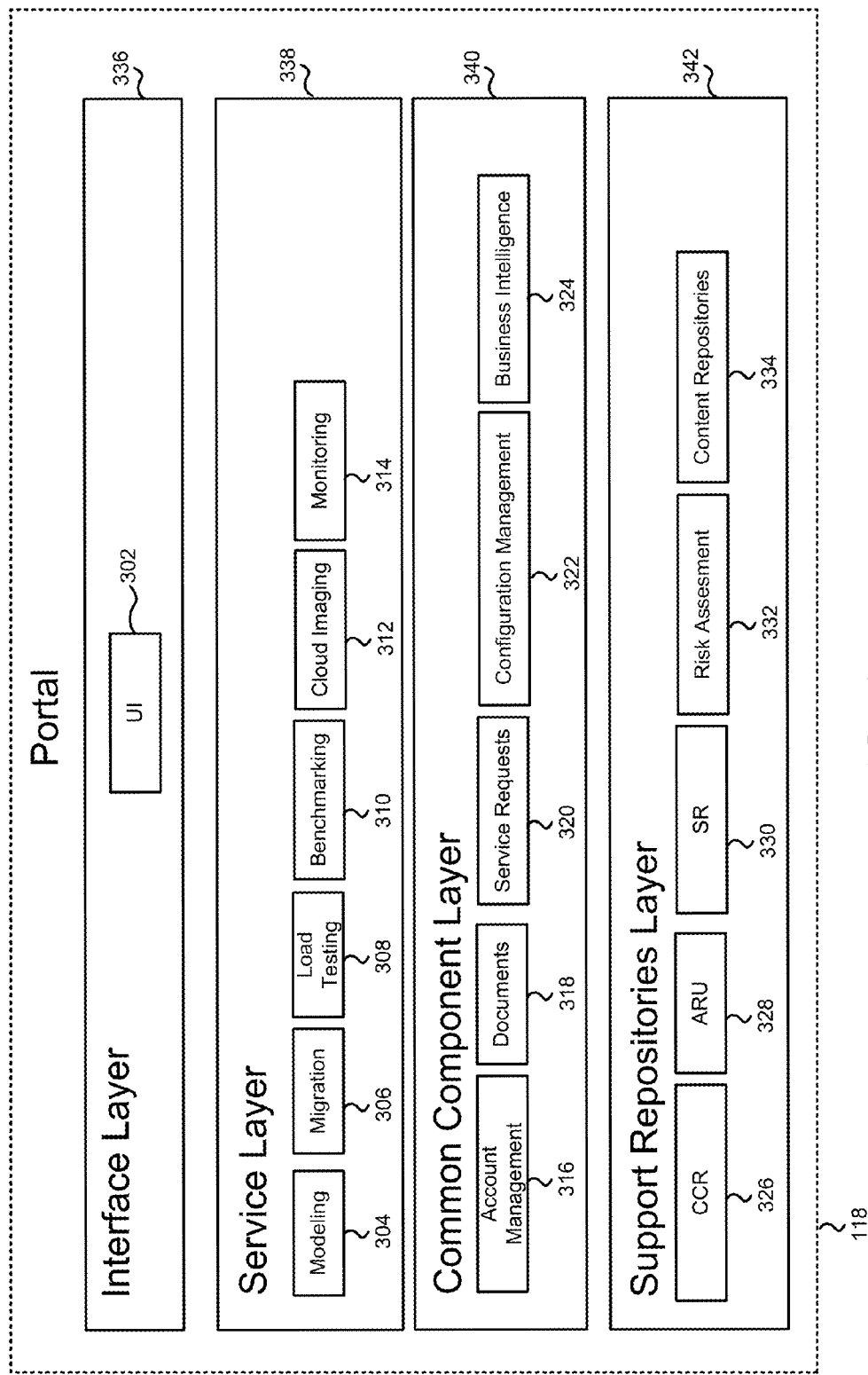
FIG. 3 illustrates a block diagram of the components of an embodiment of a portal.

FIG. 3 shows a block diagram of the structure of the portal 118. The portal 118 may be based on a layered architecture. The portal may be divided into four layers: the interface layer 336, service layer 338, common component layer 340, and a support repositories layer 342. These layers are responsible for the handling of service and customer information and the presentation and orchestration of services. The layers may be used to interface and communicate with the gateway 110, enable remote administrators to interact with data and gateway to deliver service, and/or enable customers to receive service via portal and collaborate with service provider.

The backend of the portal may include a support repositories layer 342. The layer 342 may be used to leverage various sources of data to enrich and or deliver services. The layer may include repositories or access to repositories that may include configuration, patch, SR information and data, and the like. The backend of the portal may further include a common component layer 340. Elements of the layer 340 may include components that are used in support of services during and after deployment. Elements may include an account management module 316 that provides authentication and authorization and security to the portal and the service. Customers may be provided access to the portal, and also granted access/entitlement to one or more services. The layer 340 may further include a documents module 318 which provides the methods for managing documents using the portal. Furthermore the layer 340 includes a service request module for managing the various requests and steps used in the delivery of a service. A configuration management module 322 may be used to manage the configurations associated with a customer and service engagements. A business intelligence module 324 may be used to identify high value information.

The service layer 338 of the portal 118 may include specific modules and functions required for each service. Each type of service may include defined workflow and logic, security, and/or the like. Each type of service may include a module for managing the special workflow, logic and other requirements for the service. Modules for modeling 304 (which may be referenced herein as consolidation planning service), migration 306, load testing 308, benchmarking 310, cloud imaging 312, monitoring 314 may be implemented in the layer 338. In some embodiments, the one or more migration modules 306 may include one or more components, such as a migration engine, configured to provide migration services discussed herein.

Finally, the interface layer 336 of the portal 118 provides an interface such as a graphical user interface 302 that may be used by the customer, service provider, and or administrator. The interface layer represents the presentation layer for the services. The user interface 302 of the interface layer 336 may be a responsive web design and, as such, may work on multiple devices (e.g.: desktop, phone, tablet). The UI of the portal may provide a common service interface for the services and/or content. The UI may represent and present available, installed, active, and/or like support cloud services in a consistent interface with a similar look and feel. Common user interface components may be used. Navigation methodology may be based on rich service summary reporting with drill-down for more detail. Services may be tightly coupled with customer configurations. Technical data required for service delivery (analysis, verification, reporting) may be collected automatically. Analytics may be used extensively to help reduce the information overload by creating 'easy to consume' dashboards and reports.

Figure 4:
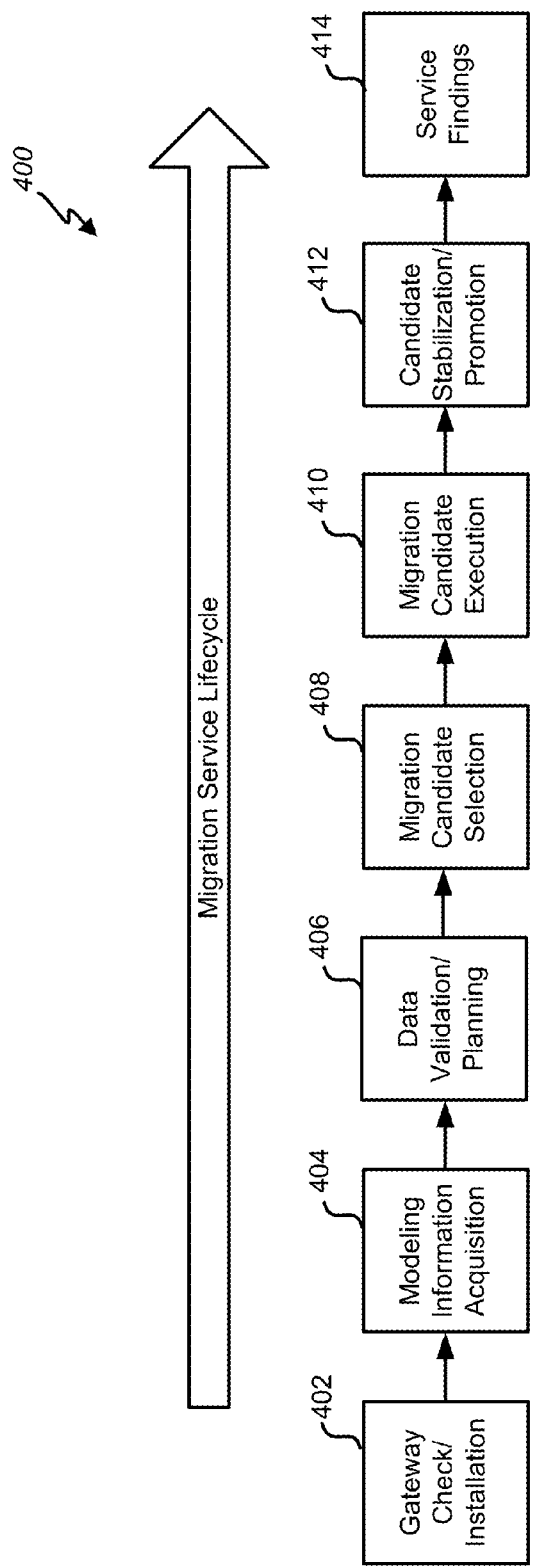
FIG. 4 illustrates a block diagram that illustrates certain aspects of a lifecycle of a migration service in accordance with certain embodiments.

FIG. 4 is a block diagram that illustrates certain aspects of a lifecycle 400 of a migration service, in accordance with certain embodiments of the present disclosure. The migration service may provide customers with legacy systems, such as, for example, databases, operating systems, applications, and/or the like, with effective migration planning and execution from non-cloud technologies to a cloud (e.g., a private cloud). The migration service may provide an automated and validated approach to such migration. Such an approach may allow a customer to meet their Recovery Time Objective (RTO). The migration service may create, test and document a migration strategy by executing a method that will reduce migration time and errors associated with migration that would otherwise impact the customer. One goal of the migration service may be to migrate the legacy system(s) to a cloud within an allotted customer outage window, the end result being that the legacy system is migrated to the cloud successfully.

One phase of the migration service lifecycle may correspond to a gateway check and/or installation phase, as indicated by block 402. It may be determined if a gateway 110 is available to give access to/from one or more customer sites in order to allow service delivery. If a gateway 110 is available, the gateway configuration may be examined to ensure that the gateway is properly configured, including the agents, with configuring of the gateway 110 and the agents being performed as necessary. In some embodiments, the gateway 110 may be one or more independent servers containing preconfigured software such as the Enterprise Manager, VM Manager, BI Publisher software, and/or the like. The gateway 110 may also contains software packages and scripts to be deployed on clients for migration purposes. If a gateway 110 is not available, it may be installed at a customer site and configured along with the agents.

One phase of the migration service lifecycle may correspond to a consolidation planning service information acquisition phase, as indicated by block 404. In some embodiments, consolidation planning service information is collected initially. However, in some embodiments, additional consolidation planning service information may be collected as the migration service progresses.

One phase of the migration service lifecycle may correspond to a data validation and/or planning phase, as indicated by block 406. Another phase of the migration service lifecycle may correspond to a migration candidate selection phase, as indicated by block 408. Another phase of the migration service lifecycle may correspond to a migration candidate execution phase, as indicated by block 410. Yet another phase of the migration service lifecycle may correspond to a candidate stabilization and/or promotion phase, as indicated by block 412. Still another phase of the migration service lifecycle may correspond to a service findings phase, as indicated by block 414. The diagram may represent an overview of certain aspects of such a lifecycle 400 of the migration service with the overall flow involved according to certain embodiments. Certain aspects of the phases are explained in greater detail with reference to the following figures.

Figure 5:
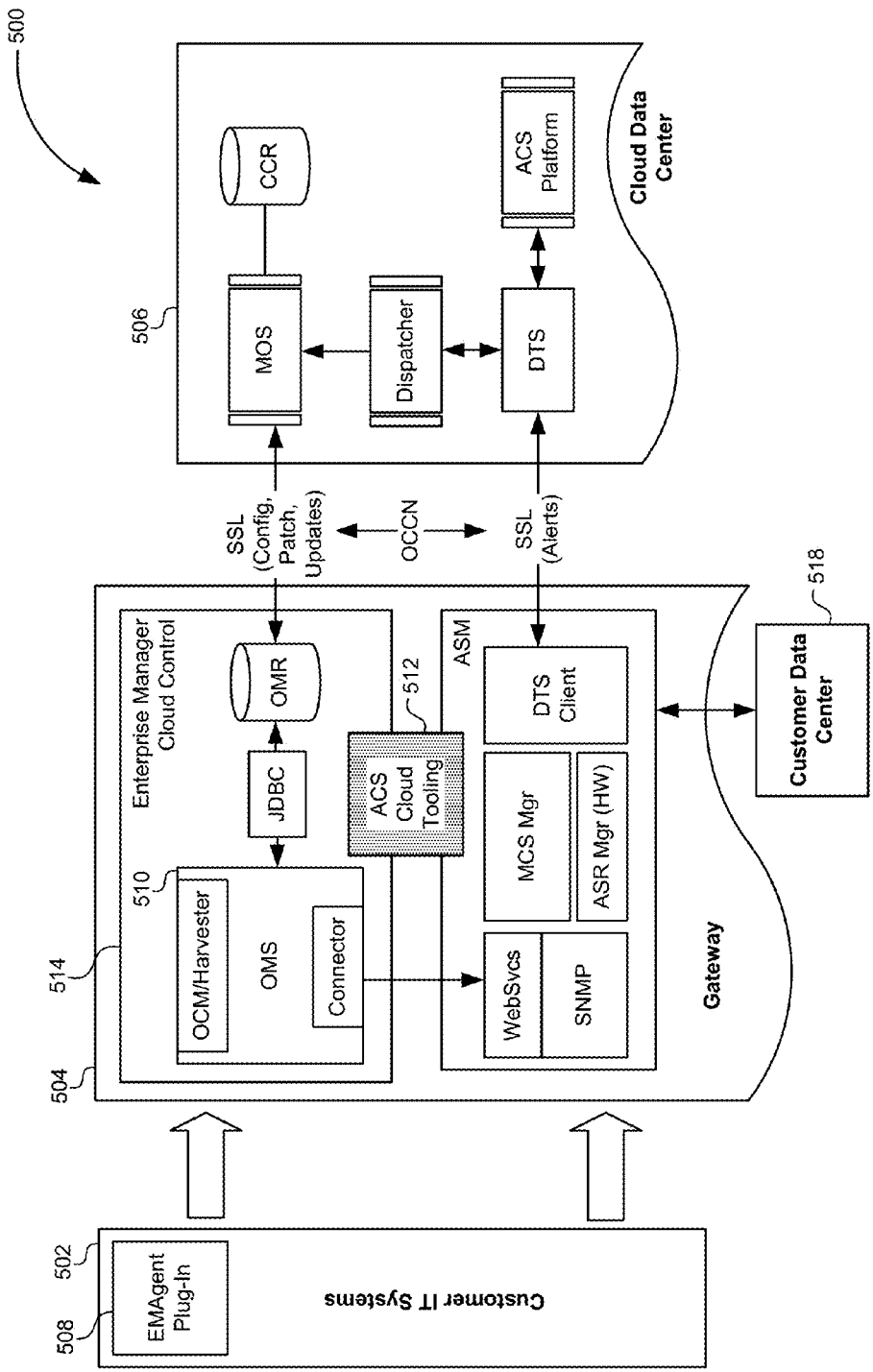
FIG. 5 illustrates a diagram of an architecture for implementing a systems consolidation planning service, according to certain embodiments.

FIG. 5 illustrates a diagram of an architecture for implementing lifecycle support services, in accordance with certain embodiments. In some embodiments, a modeling and analytics service may be designed to help customers and their business teams to perform, for example, a workload mapping exercise to achieve the most efficient and cost-effective use of their targeted migration environment without reducing their existing capabilities. The modeling and analytics service may be performed using a customer's existing system/database estate as an input. For example, a customer IT system 502 may be used. The customer IT system 502 may include multiple environments such as development, test and production environments, system components, databases, and/or the like. In many cases, systems and system components in the customer IT system 502 may be implemented with legacy hardware that is no longer considered state-of-the-art or in a system that is no longer supported as a platform or as a current-supported software version.

In order to collect performance data, an agent 508 may be deployed on the customer IT system 502. For example, an Enterprise Manager Agent may be installed as a collector that gathers information in response to detected events, such as a database going on/off line. These agents may be configured to provide performance data to an Enterprise Manager 514. The collected data may be selected so as to provide relevant system component metrics for the modeling process described below. For example, the agent 508 may be focused on capturing a production workload for a selection of system components such that they can be mapped to a destination environment on a newer, more efficient platform.

The agent 508 may send performance data collected from the customer IT system 502 to a gateway 504. In some embodiments, the collected data may be sent to the Enterprise Manager Cloud Control 514 that resides within the gateway. The gateway 504 may be configured to operate on a customer system as a control point for managing how internal users and/or application assets are exposed to outside systems. The gateway 504 may provide access security, data security, auditing and monitoring capabilities, and integration with external systems. In one embodiment, the gateway 504 may provide access to a provider data center 518 and a cloud data center 506 that is remotely located away from the customer IT system 502. The cloud data center 506 may be operated by a provider of databases, software, and other system components used by the customer IT system 502.

The gateway 504 may include a type of Enterprise Manager 514 that is configured to operate in conjunction with the cloud data center 506. A cloud tooling module 512 may operate with the enterprise manager 514 to extract and/or modify data that is already being collected by the enterprise manager 514 during normal operations. The data collected and/or modified by the cloud tooling module 512 may be selected as being relevant to modeling system operations. These data may then be provided to the cloud data center 506 for processing. In some embodiments, the gateway 504 may operate in a manner that is transparent to the customer. Data for use in system/system component modeling may be collected in the background during normal operations and stored at the provider data center 518.

Figure 6:
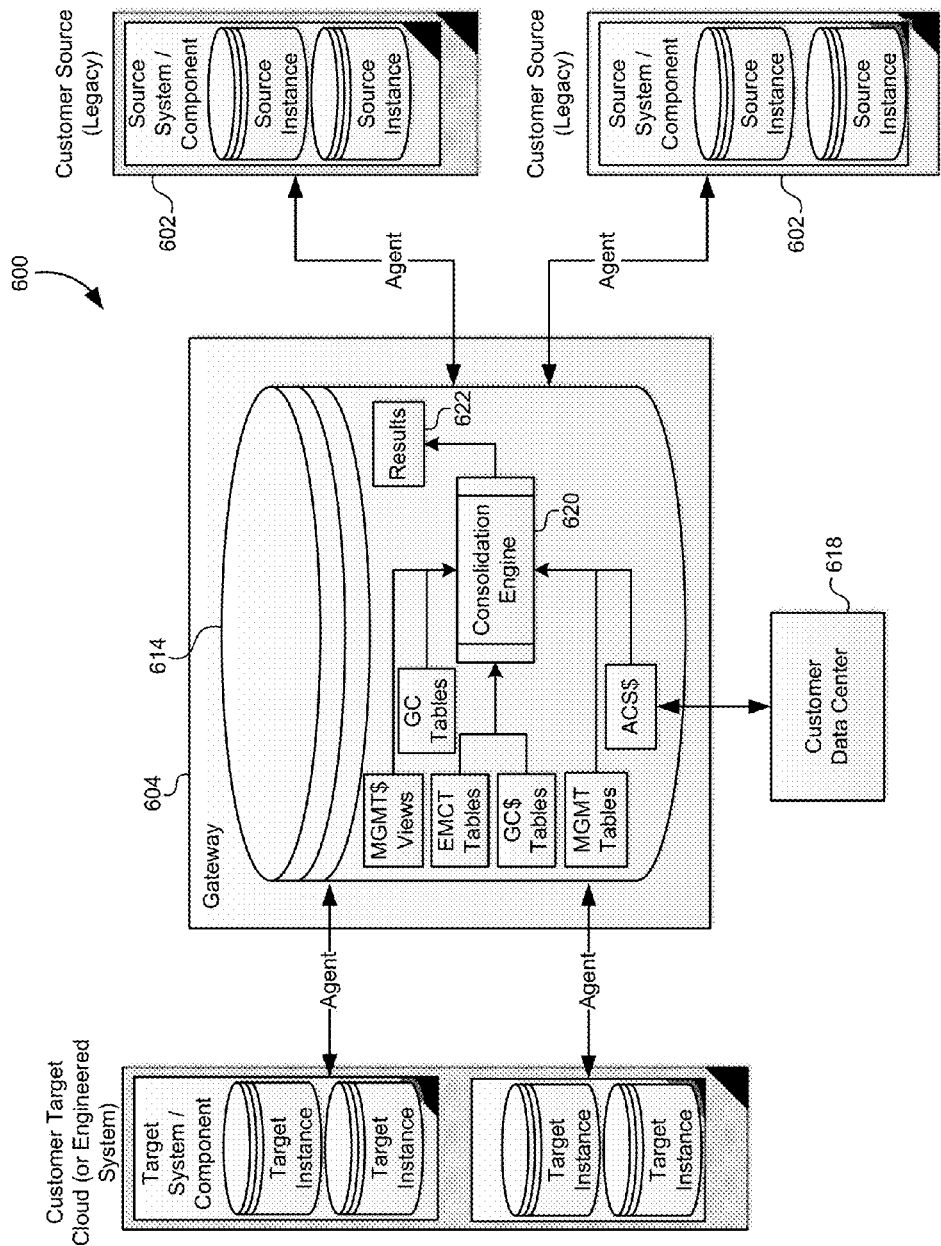
FIG. 6 illustrates a block diagram of a data storage architecture for modeling the migration of systems and/or system components, according to certain embodiments.

FIG. 6 illustrates a block diagram of a data storage architecture for modeling the migration of systems and/or system components, in accordance with certain embodiments. As described above, the gateway 604 may operate in an Enterprise Manager to record data that are relevant to migration and modeling during normal operations. The gateway 604 may include a data store 614 that is configured to store information associated with the performance of a set of legacy systems 602. The legacy systems 602 may include a large number of system components such as any one or combination of server(s), OS(s), mid-tier component(s), application(s), database(es), and/or the like. An agent installed on the legacy systems 602 may provide information to the gateway 604 that is stored in the data store 614. In some embodiments, the data store 614 may be populated continuously with data during normal operations of the legacy systems 602.

A consolidation engine 620 may read information from various tables in the data store 614, such as management tables, garbage collection tables, read/write logs, and/or the like. Note that this allows the consolidation engine 622 have historical performance data always on hand. Therefore, when a customer creates a migration scenario, the migration scenario can be modeled using historical data rather than needing to collect future data in order to complete the analysis. For example, data retrieved from the "MGMT$" tables can be crunched via the consolidation engine 620, and the results may be stored in 622 ready to be shipped back to the provider data center 618.

The consolidation engine 620 may extract the data from existing tables and fit the data into a new data model. In some embodiments, as the Enterprise Manager populates tables in the data store 614, the consolidation engine 620 may detect the changes and automatically use the data to populate the new data model. In some embodiments, the consolidation engine 620 may instead wait until a migration scenario is provided by a user before translating data from the old format into the new data model. The new data model may include data from many different databases within the data store 614.

Figure 7:
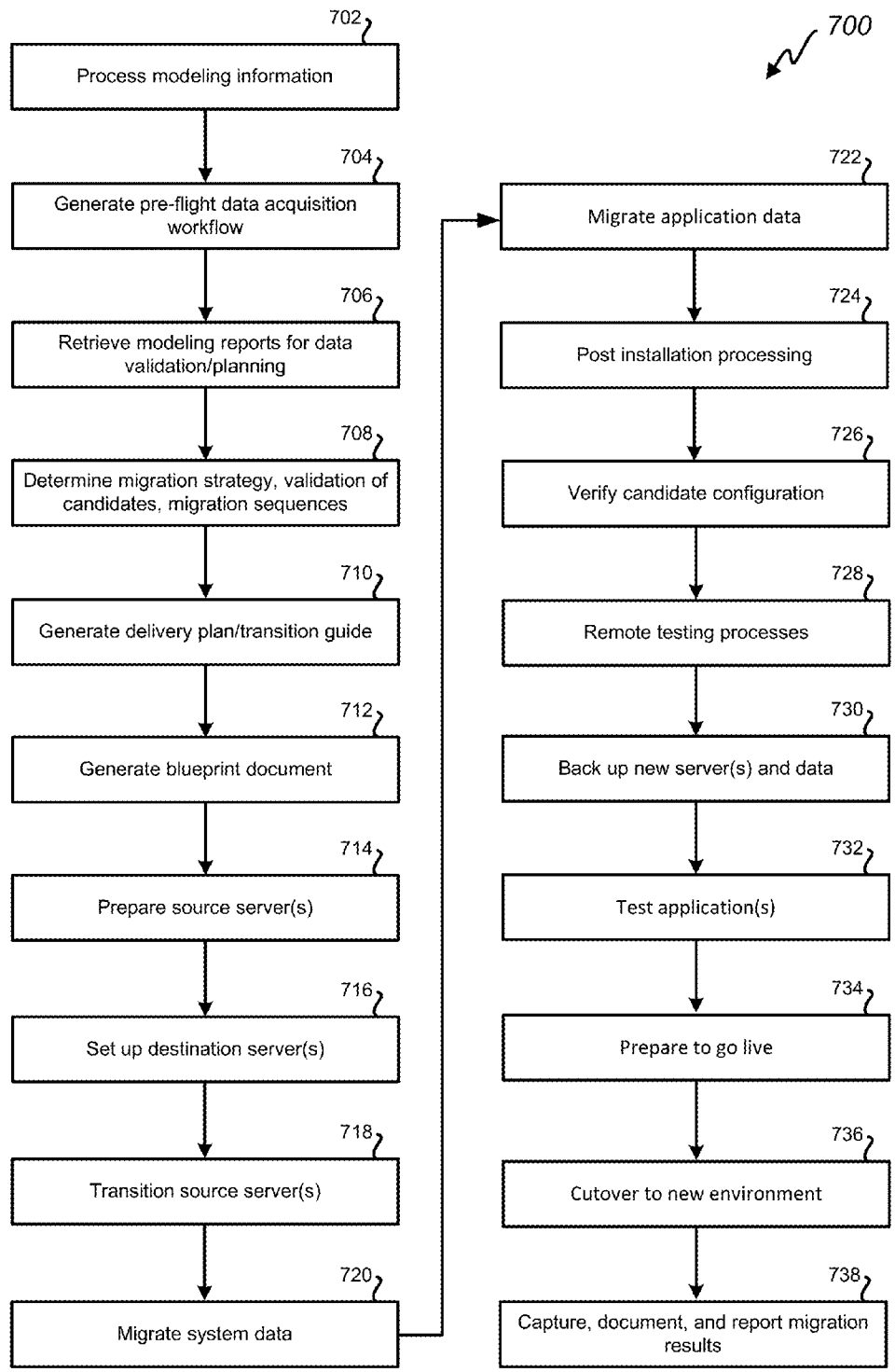
FIG. 7 illustrates a method for system migration to a cloud in accordance with certain embodiments.

FIG. 7 depicts a method 700 for system migration to a cloud, in accordance with certain embodiments of the present disclosure. Teachings of the present disclosure may be implemented in a variety of configurations. As such, the aspects comprising the services, systems, engines, and/or methods described herein may be shuffled, re-ordered, and/or omitted in any suitable manner and may depend on the implementation chosen. Moreover, while the following aspects may be separated for the sake of description, it should be understood that certain steps may be performed simultaneously or substantially simultaneously.

In various embodiments, one or more of the aspects of the method 700 may be performed with one or more systems described herein, in the incorporated patent applications, and/or with some other system configured to perform a migration between server systems. In various embodiments, one or more of the aspects of method 700 may be performed with the one or more consolidation planning service engines 304, migration engines 306, load testing engines 308, benchmarking engines 310, could imaging engines 312, and/or monitoring engines 314. Various embodiments of the system components including one or more of the engines may implement any combination of features of migration service embodiments described in the present disclosure. While the engines are indicated separately, it should be appreciated that in various embodiments the one or more engines may be implemented collectively and/or integrally. In some embodiments, the migration engine(s) 306 may be the core component for migration service. In some embodiments, the migration engine(s) 306 may be configured for all provisioning work. In some embodiments, the migration engine(s) 306 may coordinate interfacing with other engines to effect the migration service.

In various embodiments, the method 700 may begin as indicated by block 702 or with another step, such as one corresponding to the gateway check/installation phase 402. As indicated by block 702, system consolidation planning service information may be processed, which may correspond to the consolidation planning service information acquisition phase 404. In some embodiments, the acquisition of consolidation planning service information may correspond to one or more of the consolidation planning services described in one or more of the above cross-referenced U.S. patent applications. The consolidation planning service may generate one or more cloud consolidation planning service reports. The one or more cloud consolidation planning service reports may provide a basis for ensuring that the correct migration strategy and method is chosen. Each system may have various technicalities to be accommodated in order to allow transition. The cloud consolidation planning service may generate the one or more cloud consolidation planning service reports based at least in part on one or more of a system footprint, (which may specify any suitable information about one or more of memory, CPU(s), disks (IOPS), storage, network(s), and/or the like) and/or system configuration (which may specify any suitable information about one or more of patches (e.g., the patch release(s) the system is on), products, application parameters, HA (high-availability) cluster configurations, security, maintenance windows, performance and growth statistics, and/or the like.

As indicated by block 704, in some embodiments, pre-flight data acquisition for migration planning may be gathered using an automated workflow, which may correspond to the consolidation planning service information acquisition phase 404. For example, a pre-flight questionnaire workflow may be provided to a customer via the portal. In some embodiments, the pre-flight data acquisition may be used if the consolidation planning service was not used for the customer prior to the migration service.

Any suitable data may be gathered to ensure the customer's business objectives are understood and can be met. The data may specify the customer's business requirements, the number of systems, the OSs, the server hardware, the applications, the databases, and/or the like. The data may specify the details needed to identify the candidates for migration, and may include details on:

- Outage windows
- Connections to other systems
- Service-level agreements enforced on one or more server with respect to third parties
- Business objectives
- Configuration data such as host name, host ID, target VM size (CPU, memory, network, disk) based on performance and growth data, special requirements such as time schedules or security requirements, and/or the like.

Sufficient technical and business details may be gathered that so they can be effectively used for migration mapping. Any number of systems, from dozens to thousands of systems or more, for non-limiting example, can be migrated in this scalable service. All applications and databases may be supported since the service relies on sizing and performance. In some embodiments, the pre-flight acquisition may be performed at least in part before installation of the gateway 110. In that case, the data gather may capture requirements needed for the gateway 110 in order to facilitate installation and configuration of the gateway 110.

As indicated by block 706, one or more consolidation planning service reports may be retrieved for data validation and/or planning, which may correspond to the data validation/planning phase 406. Data for the planning can be gathered from the portal. All completed reports may be grouped by application and listed via the portal 118 in order to provide standardized collection and listing. In some embodiments, a single report may focus on one application and include all the servers listed under that application. This may allow for a consistent approach for accessing customer data.

As indicated by block 708, a migration strategy may be determined, which may correspond to the data validation/planning phase 406. The migration strategy may include provisions for backup/back-out operations, switchover from one or more application teams, priorities, and/or the like, which may be shown in a customizable work area that may allow for review on a system-by-system basis, subsystem-by-subsystem basis, system-component-by-system-component basis, and application-team-by-application-team basis. A transition guide is created and integrated with existing customer procurement cycles to allow for expedited systems migration. In instances where a customer's procurement cycle is too lengthy, the service could attempt to instruct them on how to proceed. In some embodiments, good candidates for cloud migration may be automatically identified and flagged. In some embodiments, one or more sequences for migrating candidates may be automatically identified and flagged. Good candidates may be the least complex candidates and/or most accessible candidates in terms of not being bound by a release cycle and/or owned by multiple business groups. From a technical standpoint, one or more rules may need to be applied to identify a candidate as viable. The rules could include, but are not limited to, any one or combination of: criticality of application; viability to move application (both technical and logistic); release cycle of application; maintenance windows; capacity and growth; executive intervention (if required); and/or the like. Means of reporting progress may be selected and/or configured. SQL statements may be embedded into scripts and written directly to a database for reporting via the portal. It should be noted that the best way to scope a migration service may be by application team, not by systems/subsystems, because applications teams will need to interface to make determinations/approvals, such as go/no-go determinations, what the release cycle will be, review of work, provision of technical information, which systems are included, and/or the like. Accordingly, based on application team information, the one or more consolidation planning service reports and reporting interfaces may be structured by application team in order for the information to better map to their business. Accordingly, certain embodiments may enable high-level strategy and validation of candidates from customer targets, as well as steps to plan and execute the migration.

As indicated by block 710, a transition guide may be generated, which may correspond to the data validation/planning phase 406. The transition guide may include a customizable description of migration steps to complete the end-to-end migration. An application priorities (both complexity and business case) report, which could be included in the transition guide, can provide an outline of sequential order for the project plan. The transition guide may be presented to, and customizable by, the customer via the portal. The customer may be provided user-selectable options to make any suitable customizations to the guide, such as add their own steps, changes the ordering of steps, and/or the like, for example. The transition guide could be provided for download by the customer. Accordingly, certain embodiments may enable a system/application level migration to follow a step-by step low level plan which can be modified throughout the migration via change control.

As indicated by block 712, a master blueprint document may be generated, which may correspond to the migration candidate selection phase 408. The master blueprint document, which could be a master spreadsheet document in some embodiments, may include details of how to build the target system. Configuration data may be automatically collected, and the system may be represented in the master blueprint document, for example, by application. In some embodiments, fields of the master blueprint document can be auto-populated based on selections from the portal. The master blueprint document could include any one or combination of:

- An instructions tab
- A server configuration tab (which may include, for example, details on platform model, cores/CPU requirements, AU requirements, memory, platform OS, zone share percentage, internal drives, NIC ports, FC ports, HA method, kernel configuration, host sharing capabilities, and/or the like)
- A cabling and IP requirements tab (which may include, for example, details on server/workload, physical (cabling) and logical (IP addressing) work necessary for the workloads and infrastructure, and/or the like)
- A file systems ownership and permissions tab (which may include, for example, details on hostnames for hosts for shared file systems, file system mountpoint or drive letter, requested size, storage types, owning ID, group ID, permission, export volume path, and/or the like)
- A workload components tab (which may include, for example, details on workload name, hostname, ENV, workload hosting compliance and decision, software, database identified (SID), revision, backup IP, workload HA, purpose, and/or the like)

A server software tab (which may include, for example, details on hostname, ENV, software, revision, purpose, and/or the like)

An Enterprise Backup and Recovery tab (which may include, for example, details on design hostname(s), datacenter/location, OS revision, clustering, and/or the like for design input to a type of EBR Planner)

A rack layout tab (which may include, for example, details on any placement constraints/requirements and/or the like)

A cluster configuration tab (which may include, for example, details on cluster type, cluster host members, cluster zones and owning global zones, cluster failover topology, failover recovery strategy, NBU media servers, cluster resource group name/owner, resource name/type/purpose, description, prioritized resource system list, virtual IP addresses, resource dependencies, resource backup strategy, and/or the like)

A glossary tab

A changes (to this document) tab, and/or the like.

Accordingly, certain embodiments may provide the customer with configuration details needed to complete the build and migration of their legacy server to the new server location.

As indicated by block 714, one or more source servers may be prepared, which may correspond to the migration candidate selection phase 408. For example without limitation, one or more operating systems may be collected and backed up. In some embodiments, Enterprise Manager may be used to make a copy of the operating system image(s) for transition to the new server. In some embodiments, depending on the OS format, various methods can be deployed. By way of example without limitation, standard fully supported operating system tools, such as the following, may be used in some implementations to complete the migration, in addition or alternative to scripting to provide a container transition utility.

For zone on ZFS, snap or pax copy may be used.

For zone on UFS/VXFS, pax copy may be used.

For base OS (e.g., Solaris 8, 9 and 10), flarcreate may be used.

There may be an exception, where, e.g., for OVM for SPARC, ldmp2v may be used.

For VM and storage configuration, VM Manager may be used.

Data also may be collected and backed up. The collected image(s) may be retained on NAS and ensured to be migratable. Based on decisions as to how the migration will proceed, backup and/or upgrade options may be selected to prepare the image(s) for transfer.

As indicated by block 716, one or more destination servers may be set up, which may correspond to the migration candidate selection phase 408. In some embodiments, the image(s) may be installed/provisioned using Enterprise Manager Ops Center. In some embodiments, one or more LUN (logical unit number) requests may be made available to a customer through the portal so that LUNs may be assigned. The customer could define and/or confirm new LUNs in some embodiments. For example without limitation, requests and/or confirmations of LUN IDs could be made via a chat box and/or email. Accordingly, the portal may provide the ability to confirm that one or more LUN IDs have been received/configured.

As indicated by block 718, one or more source server images may be transitioned, which may correspond to the migration candidate execution phase 410. A source image (e.g., a Flar file, ISO, VM image, etc.) may be located and copied over to the destination once it has been configured. In some embodiments, the portal menu-driven (scripts) tool may be used to provision the backed up OS image onto the new server. Once copied to the destination server, the new OS image may be installed on the destination server. Accordingly, certain embodiments may allow for automation of the new build As indicated by blocks 720 and 722, system data and application data may be migrated, which may correspond to the migration candidate execution phase 410. File systems and permissions may be created on newly assigned LUNs, and binary data may be copied from source to destination system(s) by selecting a migration method from a storage decision tree. In some embodiments, one or more thresholds could be imposed to manage how much storage can be moved according to various scopes of service based on speeds of transfer. For example without limitation, application data may be migrated with a threshold of 100 GB per server, and, if the threshold is met or exceeded, one or more alternative migration methods may be selected from a storage decision tree. The one or more alternative migration methods could involve automated identification of custom time and material specifications based at least in part on the amount of storage transfer needed.

The time it takes to migrate data may be based at least in part on the method selected from the storage decision tree:

Swing SAN storage

Mirror/snap data using volume manager

Copy data using SAN replication tools

Copy data using NAS replication tools

Copy data via standard network

Copy data with OS image (Flash Archive or PAX copy if a zone image)

Figure 9:
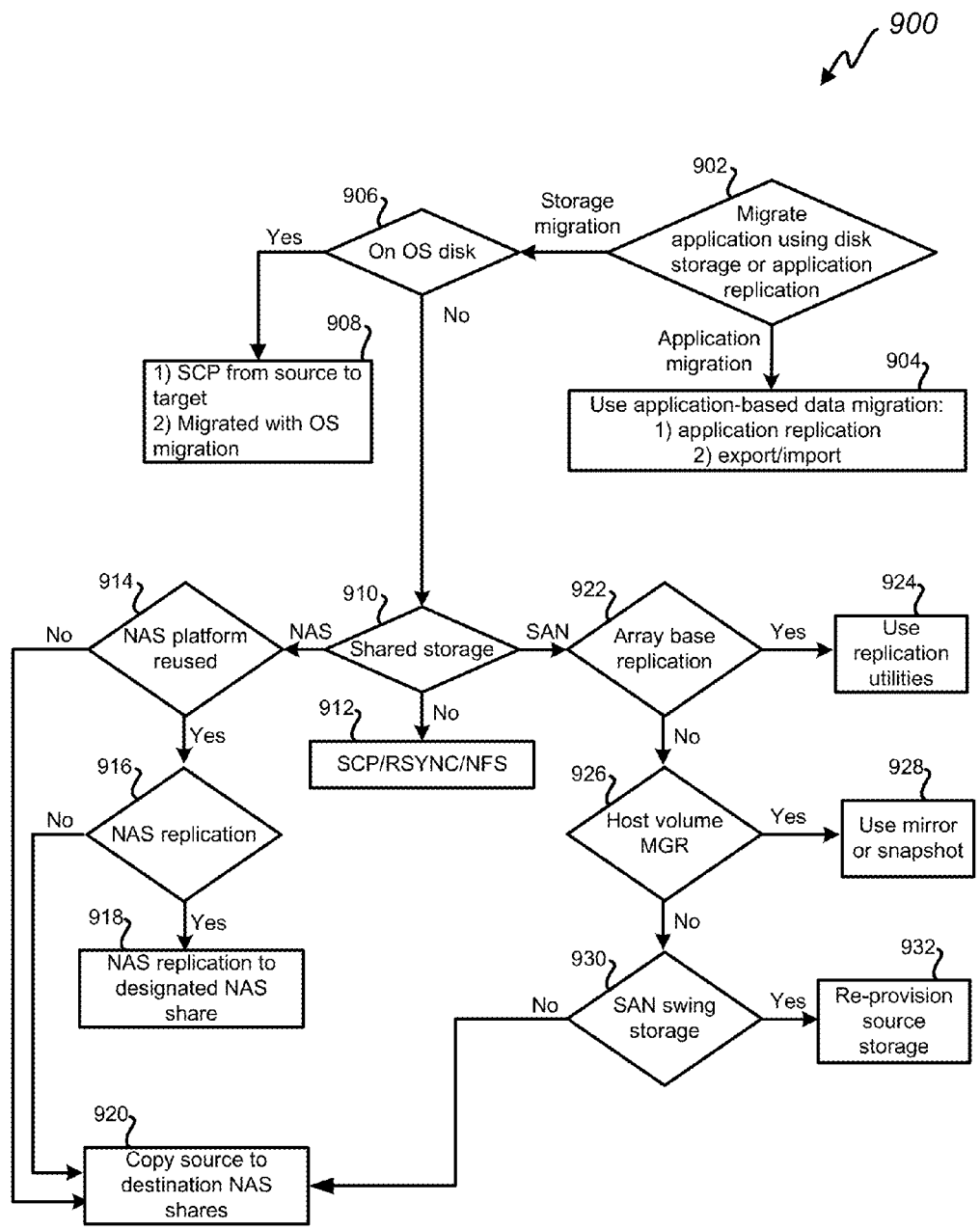
FIG. 9 depicts a method for cloud data migration decision, in accordance with certain embodiments.
Figure 10:
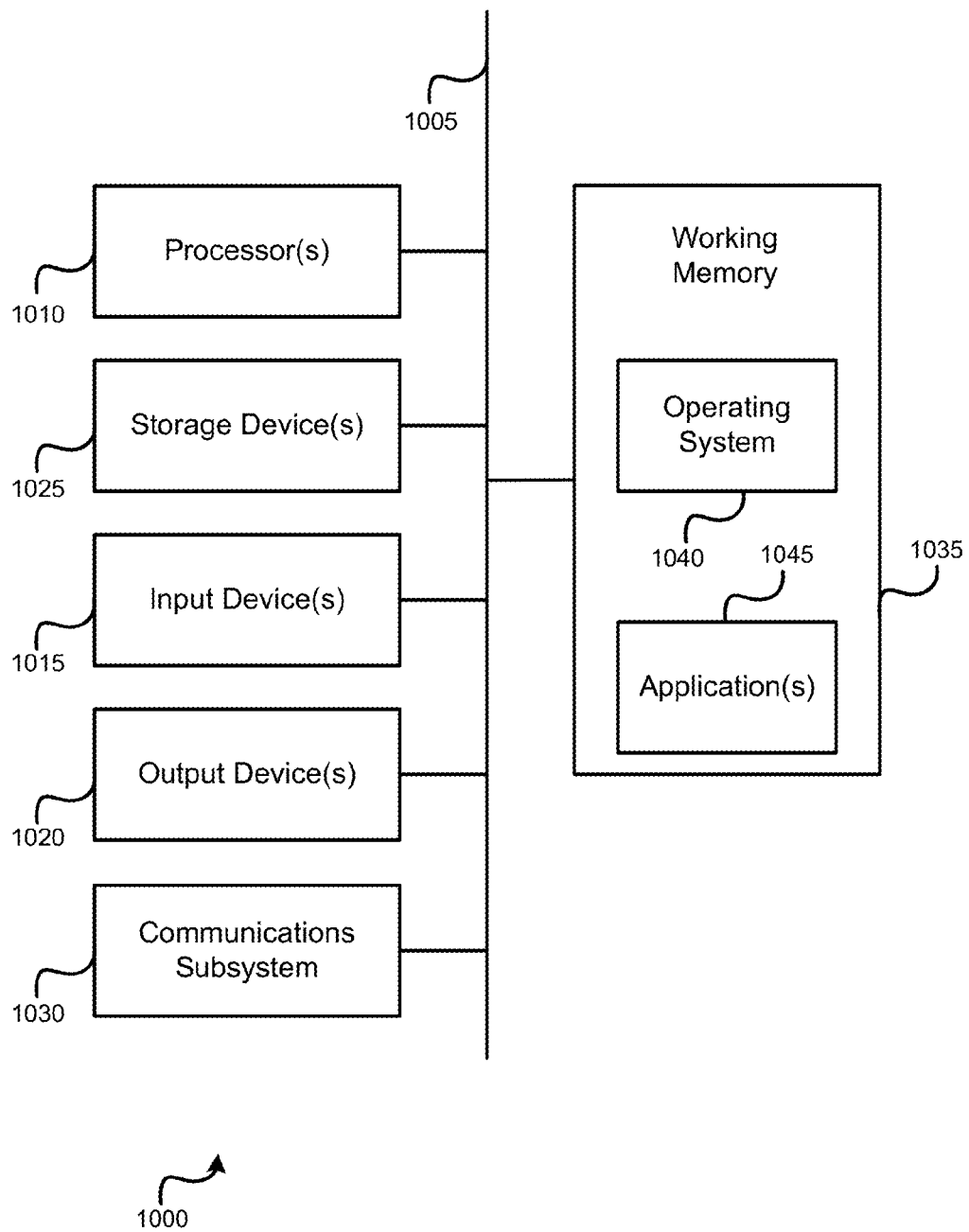
FIG. 10 illustrates an embodiment of a computer system.

For example, FIG. 9 depicts a method 900 for cloud data migration decision, in accordance with certain embodiments of the present disclosure. The method 900 may correspond to a decision tree for data migration. With the depicted method 900, it may be assumed that the OS image is already re-hosted. Only non-OS, user data, and application data may be considered for migration with method 900. As indicated by block 902, an application may be migrated using disk storage or application replication. The decision as to which migration may be based on the size of the storage footprint. In some embodiments, any suitable thresholds or limitations may be employed. For example, one service could limit application data to 100 GB. In the case of application migration, as indicated by block 904, application-based data migration may be used. Such migration may include application replication and export/import processing.

In the case of storage migration, as indicated by block 906, it may be determined whether the application is on OS disk. As indicated by block 908, if the application is on OS disk, then the migration may take the form of SCP (Secure Copy) from source to target and/or migration along with the OS migration. However, if the application is not on OS disk, then it may be determined whether the application is on shared storage, as indicated by block 910. If the application is not on shared storage, then, as indicated by block 910, SCP, RSYNC, and/or NFS (network file system) may be used. Stated otherwise, the service needs storage space to copy the operating system image to. In some cases, the application data may be transferred by some other method, but a NFS may be added to a source server to perform the backup.

With the application being on shared storage, it may be determined whether the shared storage is NAS or SAN. The case being NAS, it may be determined whether the NAS platform may be reused, as indicated by block 914. Such a determination may be based on the size and availability of the network attached storage (NAS), which may be dependent on customer logistics. If the NAS platform is not to be reused, then the source application may be copied to the destination NAS shares, as indicated by block 920. However, if the NAS platform is to be reused, then it may be determined whether there is NAS replication, as indicated by block 916. If so, then there may be NAS replication to a designated NAS share, as indicated by block 918. If not, then flow may transition to block 920, and the source application may be copied to the destination NAS shares.

In the cases that the shared storage is SAN, the possibility of array base replication may be determined, as indicated by block 922. With a positive determination, replication utilities may be used, as indicated by block 924. Otherwise, it may be determined whether a host volume manager may be used to perform host-based replication, as indicated by bock 926. In some embodiments, a type of host volume manager may be implemented with third party software. If a host volume manager is to be used, a mirror or snapshot may be used, as indicated by block 928. If not, it may be determined whether SAN swing storage is a possibility, as indicated by block 930. If so, source storage may be re-provisioned, as indicated by block 932; else, flow may transition to block 920, and the source application may be copied to the destination NAS shares.

Referring again to FIG. 7, as indicated by block 724, post installation processing may be performed, which may correspond to the migration candidate execution phase 410. Any outstanding tasks may be identified. The post installation processes may depend on how much has been transferred, any cleanup needed, de-installation and reinstallation, and/or the like. Based on the blueprint document, all configurables need to be tweaked and ready, all agents backup and monitoring) and custom customer peripherals ready and all file systems and mount points checked and accounted for. Any final application adjustments will also be done at this stage. Accordingly, certain embodiments may provide a central point of management and reporting will provide the final level of quality control before verification.

As indicated by block 726, candidate configuration may be verified, which may correspond to the candidate stabilization/promotion phase 412. For example, once a new server is built, it has to be verified to ensure all settings match the new environment for production functionality. New server settings may be compared to the old server, including license updates (if any) and patches, and/or the like. With comparison results being reported to the customer, the customer will be able to verify if key changes have been made to allow the server to operate properly in the new production environment prior to first boot, and will be able to flag any changes of interest via the automated workflow.

As indicated by block 728, remote first boot testing processes may be performed, which may correspond to the candidate stabilization/promotion phase 412. The newly migrated server(s) may be booted up and shutdown remotely to ensure it starts properly and that all services defined by the customer start correctly according to the blueprint. Accordingly, the system configuration may be tests, including mounted file systems, network settings, licenses, operating services, and/or the like needed for full production testing.

As indicated by block 730, newly migrated server(s) and data may be backed up, which may correspond to the candidate stabilization/promotion phase 412. A snapshot of the system image may be taken. In some embodiments, backup could be provided and performed automatically on behalf of the customer according to the blueprint. In some embodiments, the customer could indicate a backup strategy, and the backup processes could adapt to it. In some embodiments, the portal may be used to report to the customer it is time to for server back up using the customer's backup tools. To confirm successful backup, the customer may be prompted to provided confirmation via the workflow. Confirmation from the customer will be of value should something happen to the server(s) during subsequent steps.

As indicated by block 732, one or more applications may be tested, which may correspond to the candidate stabilization/promotion phase 412. The customer's application(s) may be load tested. In some embodiments, such testing in performed on behalf of the customer. In some embodiments, the customer may load test the applications via the portal. In either case, test findings may be reported to the customer via the portal, proving the performance and operational success of the new application server. The positive test results may allow the scheduling of a 'go live' date.

As indicated by block 734, preparations to go live may be made, which may correspond to the candidate stabilization/promotion phase 412. A calendar and a short customizable check list may be generated for the customer to prepare and execute their cutover to production. A customizable back-out plan may also be generated. Accordingly, certain embodiments may include steps and a schedule in a manner that will allow the customer to plan and execute successfully.

As indicated by block 736, cutover to the new environment may be performed, which may correspond to the candidate stabilization/promotion phase 412. In some embodiments, cutover may be automated. Enterprise Manager could be used to schedule and effect the cutover in combination with customer resources, and one or more application teams may cut over to the new environment. In some embodiments, reporting could be performed with the portal, which could present stages of migration or simply a green/red status for 'go/no go' prior to final cutover. At this critical stage, providing a state for both systems indicates the potential success of the final step. The reporting may allow for real-time views of the move to production and may allow for customer verification. In some embodiments, the cutover process allows the customer to perform final testing. Decommissioning of the system may then follow, with progress reported via the portal decommissioning statuses, such as ready for decommissioning, decommissioning in progress, decommissioning complete, and/or the like.

As indicated by block 738, migration results could be captured, documented, and reported, which may correspond to the serviced findings phase 414. A mechanism may be provided to save all graphs and other content from the above and export the content in to a documented structure. A template document may be provided to report all summary details in one or more Exportable summary reports. A delivery mechanism may allow for standard text in summary report templates, change processes for easily adding and removing content such as topics, different types of graphs, and/or the like. Such change processes may allow for addition of new queries to BI Publisher to generate new graphs for the summary reporting in order to adapt to market changes quickly should other customers require migration reports to focus on certain requirements. Accordingly, certain embodiments may allow for the provision of offline content in a documented structure and for the flexibility to adapt to customer requirements without having to go back to development to customize the reporting capability of the tool.

Figure 8A:
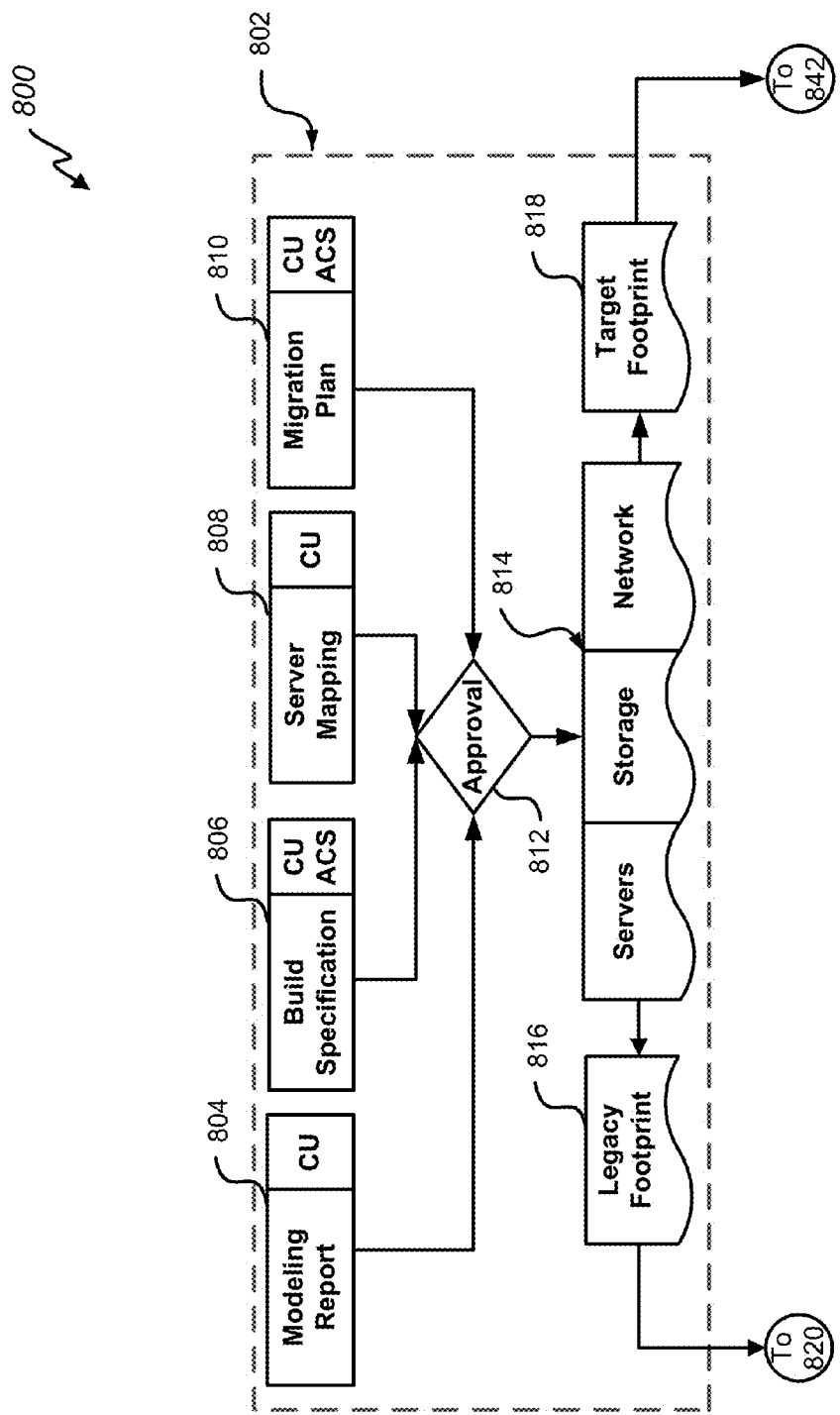
FIGS. 8A and 8B illustrate a high-level block diagram of a cloud migration service in accordance with certain embodiments.
Figure 8B:
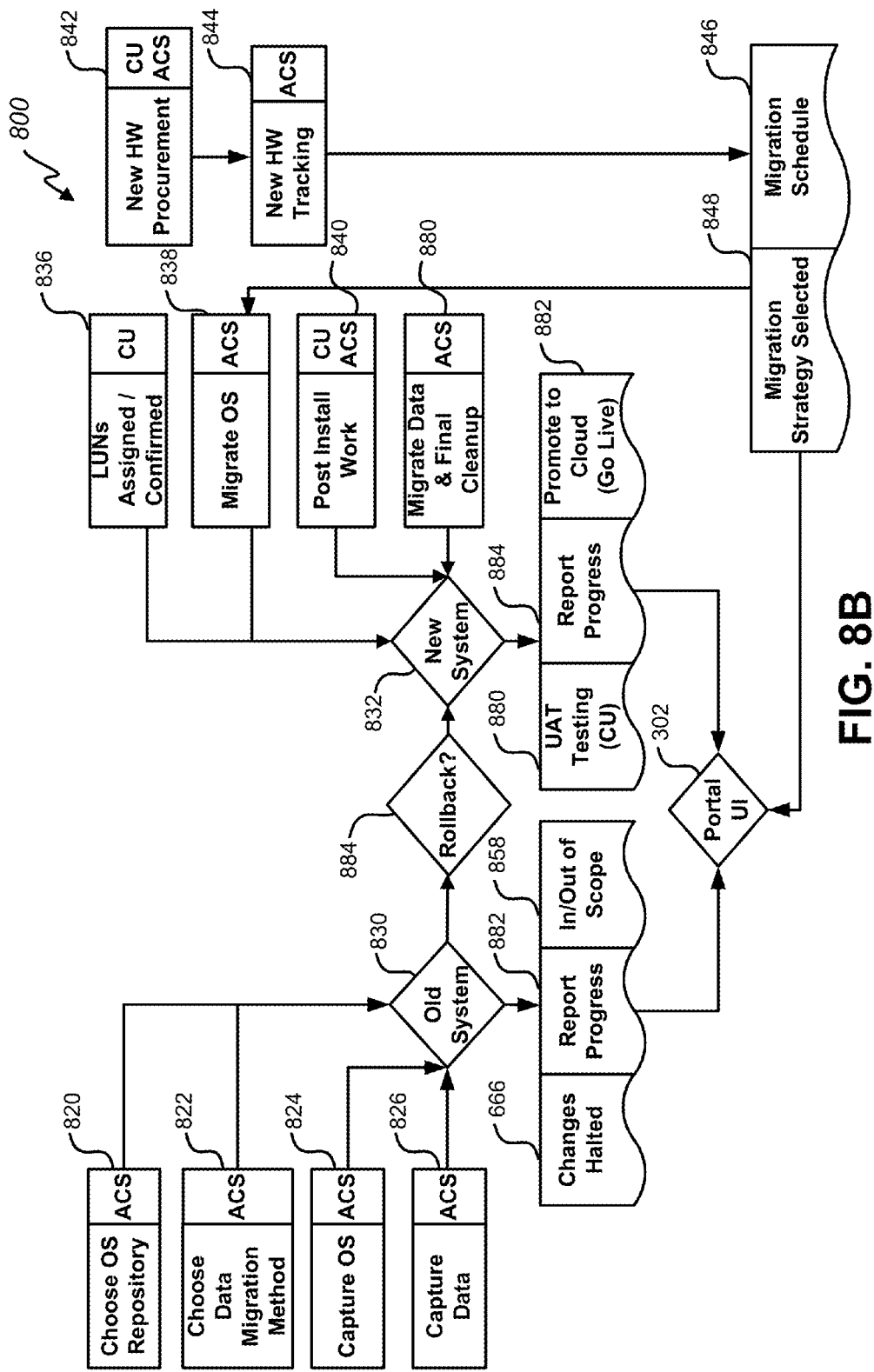

FIGS. 8A and 8B depict a high-level block diagram of a cloud migration service 800, in accordance with certain embodiments of the present disclosure. Teachings of the present disclosure may be implemented in a variety of configurations. As such, the aspects comprising the services, systems, engines, and/or methods described herein may be shuffled, re-ordered, and/or omitted in any suitable manner and may depend on the implementation chosen. Moreover, while the following aspects may be separated for the sake of description, it should be understood that certain steps may be performed simultaneously or substantially simultaneously.

The cloud migration service 800 may include one or more feed information components 802. In some embodiments, the migration engine(s) 306 may utilize one or more interfaces to access one or more information feeds, and may pull and/or push information from other system components in any suitable way. As discussed herein, different sets of information may come from different sources. The migration engine(s) 306 could process data pulled and/or pushed, consolidate the data, and retain the data in any suitable repositories. The migration engine(s) 306 may accord a measure of reliability, consistency, comprehensiveness, thoroughness, and/or accuracy to the system/migration information. The consolidation may include organizing, categorizing, qualifying, and/or comparing the sets of information; detecting, identifying, and/or handling errors/discrepancies; and/or otherwise processing the sets of system/migration information. Thus, the system/migration may be automatically organized into easy-to-understand categories and documents.

The feed information components 802 may include consolidation planning service report component 804. In some embodiments, the feed information components 802 may include a consolidation planning service information processor of the migration engine(s) 306. Consolidation planning service information, which may be in the form of one or more consolidation planning service reports, may be captured and processed. As discussed herein, one or more cloud consolidation planning service reports 804 obtained via the cloud consolidation planning service, in some embodiments. In some embodiments, Enterprise Manager could be used to perform the data capture for the migration work should consolidation planning service data be not otherwise available. In addition or in the alternative, in some embodiments, pre-flight data acquisition for migration planning may be gathered of or in combination, as discussed herein. In some embodiments, various points in the process could include any one or combination of suitable interface points via the portal with the customer and/or advanced customer service. By way of example without limitation, such interface points could include one or more those depicted by CU (for customer interface) and/or ACS (for advance customer service).

The feed information components 802 may include a build specification component 806. In some embodiments, the feed information components 802 may include a specification builder 806 of the migration engine(s) 306. The specification builder 806 may be configured to generate, gather, retain, modify, and/or convey a build specification. The build specification may be based at least in part on the results from the consolidation planning service information processor 804. Consolidation planning service information for a particular customer system may be drawn from BI Publisher or may be otherwise imported. A build specification may correspond to a blueprint that contains information needed for construction of a target system.

The feed information components 802 may include server mapping component 808. In some embodiments, the feed information components 802 may include a server mapper 808 of the migration engine(s) 306. The server mapper 808 may generate, gather, retain, modify, and/or convey server mapping information that may track progress in the construction of the new environment. System components of the customer system may be identified, detailed, and specified by technical data (number of datacenters, etc.) and mapped to new system components being rolled out.

The feed information components 802 may include migration plan component 810. In some embodiments, the feed information components 802 may include a migration planner 810 of the migration engine(s) 306. The migration planner 810 may generate, gather, retain, modify, and/or convey migration strategy information. The migration strategy information may indicate what is going to happen when, whether one application is more important than another, red/green light activity, what is on hold, what is a go, a project plan, a project schedule, and/or the like.

At a decision point 812, any suitable information based at least in part on any one or combination of the consolidation planning service information, the one or more build specifications, the server mapping, and the migration planning may be presented to a customer for approval. Having reviewed such information that may indicate a current and/or future state of the target system, the customer may provide approval to allow the service flow to move forward. Once approval is met, flow may transition to an inventory coordination component 814.

In some embodiments, the inventory coordination component 814 may include an inventor coordinator 814 of the migration engine(s) 306. The inventory coordinator 814 may handle management of inventory items corresponding to one or more of server inventory items, storage inventory items, and/or network inventory items. The inventory items may be dynamically coordinated between a legacy footprint 816 and a target footprint 818, one or both of which may be generated by the migration engine(s) 306 in some embodiments. The inventor coordinator 814 may adapt to various configurations. For example without limitation, a customer may wish to keep certain previous storage items or server, and the inventory coordinator 814 may accommodate the retention of legacy components, coordinating touch points as between the legacy components and the target components. Accordingly, the inventor coordinator 814 may coordinate what the process will be of capturing images from the legacy systems.

As indicated by 820, one or more OS repositories may be chosen for the laying of OS images. An old server may not have space. Instead, the image may be laid on another repository, NAS, for example, and the NAS could be connected to the old server. The OS image(s) could be dropped on the NAS for transition to the new system. As indicated by 836, LUNs (logical unit numbers) may be assigned. As discussed herein, file systems and permissions may be created on newly assigned LUNs, and binary data may be copied from source to destination system(s) by selecting a migration method from a storage decision tree. The customer could define and/or confirm new LUNs in some embodiments.

As indicated by 822, a data migration method may be chosen. In some embodiments, a data migration method may be chosen with a data migration decision tree, as discussed further herein. As indicated by 824, one or more OS image(s) may be captured. By way of example without limitation, where operating system images need to be captured, a 'flarcreate' utility could be used in the case of flash archives, 'zoneadm' could be used to clone zones, or 'pax' could be used to copy an original zone image. The 'ldmp2v' utility may be used to move standalone OS images to VM for SPARC (aka LDOMs). In some cases, 'ZFS' utilities could be used to snap copy data. VM Manager could be used to configure VMs and possibly add storage to them as well. The above highlights one decision process for migrating specific types of OS data.

As indicated by 826, data may be captured. For example, application data may be captured depending on the migration plan. As indicated by 838, the OS image(s) may be migrated from the old system 830 to the new system 832. The OS image(s) may be migrated as described in the blueprint configuration and transition guide. In some embodiments, the migration engine(s) 306 may be configured to capture an image of the old server and drop it on a new server according to a one for one scheme, like for like, such that the OS takes up the whole physical box. In some embodiments, the migration engine(s) 306 may be configured to capture an image of the old server and drop it on a new server according as a virtual instance on the new server so that the customer can consolidate their environment.

In some embodiments, the migration engine(s) 306 may employ code-wrapped shell scripts for information capture and transition. The code could be C code or any suitable code in various embodiments. The scripting could be UNIX scripting and/or the like in various embodiments. The shell scripts are packaged so that they can be dropped onto the legacy servers and then executed (as a C program, e.g.) according to code wrapping in order to capture information, such as an OS, the file systems, auxiliary data, and/or the like, while protecting the scripts. Execution of migration scripts may be initiated by another network-accessible system. In some embodiments, an administrator can access the customer site (via a VPN, e.g.) to initiate execution on the legacy system. The migration scripts executed by the legacy processing resources may be copy scripts configured to copy any one or combination of any suitable system components, such as an OS, database, etc. from legacy server system to the new system. In some embodiments, migration scripts may be executed by the new system to receive system components from the legacy system and create corresponding components in the new system.

As indicated by 840, post-install work may be performed. Say a customer has particular software, say monitoring software, which needs to be de-installed and re-installed on a new server. Such software may be installed as part of the post-install work phase.

As indicated by 842, in some embodiments, new hardware may need to be procured. Delivery times may be accounted for by the migration engine(s) 306. The migration engine(s) 306 may track delivery times for hardware, as indicated by 844. A delivery timeline may be generated and taken into account along with migration schedule, as indicated by 846. Knowing all those factors, the migration engine(s) 306 may build a migration strategy, as indicated by 848, and may then execute according to that strategy. The migration engine(s) 306 may coordinate the timing such that, when the hardware is in place, an OS image(s) can be located/obtained from the NAS, and transitioned to the target. Similarly, as indicated by 850, data may be migrated, and final cleanup maybe performed.

As indicated by 852 and 854, reporting progress on the old systems and on the new systems may be performed. In some embodiments, the migration engine(s) 306 may include a reporting engine that handles reporting. To indicate progress, the old system components could be mapped to the new system components. Reporting options could be directed to the customer and/or the project team via the portal UI 302. In some embodiments, reporting may not include indications of progress, but also prompts, gates, and/or links to next steps and/or required information. Some embodiments could provide simultaneous reporting with each or certain steps to the customer and the project team. The reporting options could include one or more high-level views, with options to drill down to more detailed views of the system progress. In some embodiments, reporting may include listing the migration images to allow the customer to prioritize and prevent any administrators from making further OS changes. Reporting may include identifying the location of images. Reporting may include notifying the customer when an image has been collected and that no further OS changes can occur. Accordingly, certain embodiments may provide for automatically identifying and reporting on progress.

As indicated by 856, one or more interfaces may be provided for halting changes, as determined by the migration engine(s) 306 and/or migration team. In some embodiments, customer change processes may be followed to ensure current customer stability is not compromised during the preparation and migration steps. As indicated by 858, one or more modules of the migration engine(s) 306 may be configured for discriminating which items are in/out of scope according to the migration plan. In some embodiments, one or more interfaces may be provided for reviewing and/or designating items as in/out of scope.

As indicated by 860, user acceptance testing may be performed by the customer on the new system. As indicated by 862, new system components may be promoted to the cloud to go live. As indicated by 864, a rollback option may be provided. In the event that something fails on target system or a rollback is otherwise desirable, the rollback option provides the ability to roll back to the old system.

FIG. 9 illustrates an embodiment of a computer system. A computer system as illustrated in FIG. 9 may be incorporated as part of the previously described computerized devices, such as the portal, gateway, and other elements of the platform 90. FIG. 9 provides a schematic illustration of one embodiment of a computer system 900 that can perform various steps of the methods provided by various embodiments. It should be noted that FIG. 9 is meant only to provide a generalized illustration of various components, any or all of which may be utilized as appropriate. FIG. 9, therefore, broadly illustrates how individual system elements may be implemented in a relatively separated or relatively more integrated manner.

The computer system 900 is shown comprising hardware elements that can be electrically coupled via a bus 905 (or may otherwise be in communication, as appropriate). The hardware elements may include one or more processors 910, including without limitation one or more general-purpose processors and/or one or more special-purpose processors (such as digital signal processing chips, graphics acceleration processors, video decoders, and/or the like); one or more input devices 915, which can include without limitation a mouse, a keyboard, remote control, and/or the like; and one or more output devices 920, which can include without limitation a display device, a printer, and/or the like.

The computer system 900 may further include (and/or be in communication with) one or more non-transitory storage devices 925, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable and/or the like. Such storage devices may be configured to implement any appropriate data stores, including without limitation, various file systems, database structures, and/or the like.

The computer system 900 might also include a communications subsystem 930, which can include without limitation a modem, a network card (wireless or wired), an infrared communication device, a wireless communication device, and/or a chipset (such as a Bluetooth™ device, an 802.11 device, a WiFi device, a WiMax device, cellular communication device, etc.), and/or the like. The communications subsystem 930 may permit data to be exchanged with a network (such as the network described below, to name one example), other computer systems, and/or any other devices described herein. In many embodiments, the computer system 900 will further comprise a working memory 935, which can include a RAM or ROM device, as described above.

The computer system 900 also can comprise software elements, shown as being currently located within the working memory 935, including an operating system 940, device drivers, executable libraries, and/or other code, such as one or more application programs 945, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the non-transitory storage device(s) 925 described above. In some cases, the storage medium might be incorporated within a computer system, such as computer system 900. In other embodiments, the storage medium might be separate from a computer system (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computer system 900 and/or might take the form of source and/or installable code, which, upon compilation and/or installation on the computer system 900 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 900) to perform methods in accordance with various embodiments of the invention. According to a set of embodiments, some or all of the procedures of such methods are performed by the computer system 900 in response to processor 910 executing one or more sequences of one or more instructions (which might be incorporated into the operating system 940 and/or other code, such as an application program 945) contained in the working memory 935. Such instructions may be read into the working memory 935 from another computer-readable medium, such as one or more of the non-transitory storage device(s) 925. Merely by way of example, execution of the sequences of instructions contained in the working memory 935 might cause the processor(s) 910 to perform one or more procedures of the methods described herein.

The terms "machine-readable medium," "computer-readable storage medium" and "computer-readable medium," as used herein, refer to any medium that participates in providing data that causes a machine to operate in a specific fashion. These mediums may be non-transitory. In an embodiment implemented using the computer system 900, various computer-readable media might be involved in providing instructions/code to processor(s) 910 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 925. Volatile media include, without limitation, dynamic memory, such as the working memory 935.

Common forms of physical and/or tangible computer-readable media include, for example, a floppy disk, a flexible disk, hard disk, magnetic tape, or any other magnetic medium, a CD-ROM, any other optical medium, any other physical medium with patterns of marks, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 910 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 900.

The communications subsystem 930 (and/or components thereof) generally will receive signals, and the bus 905 then might carry the signals (and/or the data, instructions, etc. carried by the signals) to the working memory 935, from which the processor(s) 910 retrieves and executes the instructions. The instructions received by the working memory 935 may optionally be stored on a non-transitory storage device 925 either before or after execution by the processor(s) 910.

It should further be understood that the components of computer system 900 can be distributed across a network. For example, some processing may be performed in one location using a first processor while other processing may be performed by another processor remote from the first processor. Other components of computer system 900 may be similarly distributed. As such, computer system 900 may be interpreted as a distributed computing system that performs processing in multiple locations. In some instances, computer system 900 may be interpreted as a single computing device, such as a distinct laptop, desktop computer, or the like, depending on the context.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A system migration engine to perform system migration operations, the system migration engine comprising:
   one or more processors configured to execute instructions to:
      collect information indicative of one or more migration candidates corresponding to one or more system components in a source system;
      determine a migration strategy at least partially based on the information indicative of one or more migration candidates, the determining the migration strategy comprising:
         prioritizing the one or more migration candidates for migration based at least in part on one or more rules and one or more of criticality of application, complexity of application, and/or release cycle;
         identifying a sequence for migrating the one or more migration candidates; and
         generating a migration schedule;
      generate a transition guide that indicates migration steps corresponding to the migration strategy;
      map the one or more migration candidates to one or more system components of a target system; and
      generate, based on the migration steps indicated by the transition guide, one or more scripts configured to copy system data and/or application data corresponding to the one or more system components in the source system for migration to the target system; and
   one or more storage media coupled to the one or more processors to retain the instructions.

2. The system migration engine of claim 1, wherein the collecting information indicative of the one or more migration candidates comprises collecting consolidation information associated with one or more system components in the source system.

3. The system migration engine of claim 1, wherein the one or more processors are further configured to execute instructions to: select a data migration method at least partially based on the information indicative of the one or more migration candidates.

4. The system migration engine of claim 3, wherein the selection of the data migration method is based at least in part on a migration method decision tree.

5. The system migration engine of claim 3, wherein the data migration method comprises a method selected from a data migration decision tree that includes decision rules for one or more of application migration, storage migration, operating system storage, and/or shared storage.

6. The system migration engine of claim 1, wherein the determining the migration strategy comprises determining the sequence for migrating the one or more migration candidates.

7. The system migration engine of claim 1, wherein the collecting information indicative of the one or more migration candidates comprises one or more indications of a workflow presented through a portal of a remote cloud service operated by a provider of the target system.

8. The system migration engine of claim 1, wherein the one or more processors are further configured to execute instructions to generate a blueprint document indicating details of how to build the target system.

9. The system migration engine of claim 1, wherein the one or more processors are further configured to execute instructions to provide one or more indications of a migration progress through a portal of a remote cloud service operated by a provider of the target system.

10. A method to perform system migration operations, the method comprising:
    collecting by a server system information indicative of one or more migration candidates corresponding to one or more system components in a source system;
    determining a migration strategy by the server system at least partially based on the information indicative of one or more migration candidates, the determining the migration strategy comprising:
       prioritizing the one or more migration candidates for migration based at least in part on one or more rules, and one or more of criticality of application, complexity of application, and/or release cycle;
       identifying a sequence for migrating the one or more migration candidates; and
       generating a migration schedule;
    generating a transition guide that indicates migration steps corresponding to the migration strategy;
    mapping by the server system the one or more migration candidates to one or more system components of a target system; and
    generating by the server system, based on the migration steps indicated by the transition guide, one or more scripts configured to copy system data and/or application data corresponding to the one or more system components in the source system for migration to the target system.

11. The method of claim 10, wherein the collecting information indicative of one or more migration candidates comprises collecting consolidation information associated with one or more system components in the source system.

12. The method of claim 10, further comprising:
selecting a data migration method at least partially based on the information indicative of the one or more migration candidates.

13. The method of claim 12, wherein the selection of the data migration method is based at least in part on a migration method decision tree.

14. The method of claim 12, wherein the data migration method comprises a method selected from a data migration decision tree that includes decision rules for one or more of application migration, storage migration, operating system storage, and/or shared storage.

15. A non-transitory computer-readable storage medium having stored thereon instructions for performing system migration operations, which instructions, when executed by one or more processors, cause the one or more processors to:
collect information indicative of one or more migration candidates corresponding to one or more system components in a source system;
determine a migration strategy at least partially based on the information indicative of one or more migration candidates, the determining the migration strategy comprising:
prioritizing the one or more migration candidates for migration based at least in part on one or more rules, and one or more of criticality of application, complexity of application, and/or release cycle;
identifying a sequence for migrating the one or more migration candidates; and
generating a migration schedule;
generate a transition guide that indicates migration steps corresponding to the migration strategy;
map the one or more migration candidates to one or more system components of a target system; and
generate, based on the migration steps indicated by the transition guide, one or more scripts configured to copy system data and/or application data corresponding to the one or more system components in the source system for migration to the target system.

16. The non-transitory computer-readable storage medium of claim 15, wherein the collecting information indicative of the one or more migration candidates comprises collecting consolidation information associated with one or more system components in the source system.

17. The non-transitory computer-readable storage medium of claim 15, wherein the instructions further cause the one or more processors to:
select a data migration method at least partially based on the information indicative of the one or more migration candidates.

18. The non-transitory computer-readable storage medium of claim 17, wherein the selection of the data migration method is based at least in part on a migration method decision tree.

19. The non-transitory computer-readable storage medium of claim 15, wherein the data migration method comprises a method selected from a data migration decision tree that includes decision rules for one or more of application migration, storage migration, operating system storage, and/or shared storage.

* * * * *

UNITED STATES PATENT AND TRADEMARK OFFICE
CERTIFICATE OF CORRECTION

PATENT NO. : 9,098,364 B2  Page 1 of 1
APPLICATION NO. : 13/938066
DATED : August 4, 2015
INVENTOR(S) : Davis It is certified that error appears in the above-identified patent and that said Letters Patent is hereby corrected as shown below:

In the specification,

In column 1, lines 4-5, below "APPLICATIONS" insert -- The present application is related to the following co-pending and commonly assigned U.S. Patent Applications, each of which is incorporated herein by reference for all purposes: --.

In column 8, line 67, delete "and or" and insert -- and/or --, therefor.

In column 9, line 36, delete "and or" and insert -- and/or --, therefor.

In column 16, line 8, delete "build" and insert -- build. --, therefor.

In the claims,

In column 25, line 51, in Claim 1, delete "rules" and insert -- rules, --, therefor.

Signed and Sealed this
Thirty-first Day of May, 2016

Michelle K. Lee
*Director of the United States Patent and Trademark Office*